United States Patent
Lem et al.

(10) Patent No.: US 6,378,687 B1
(45) Date of Patent: *Apr. 30, 2002

(54) HIGH SPEED SORTING/DIVERTING APPARATUS, AN APPARATUS CONTROLLER AND SYSTEMS USING SAME

(75) Inventors: Hans J. Lem, Franklin Lakes, NJ (US); Richard J. Bowman, Levittown, PA (US); Robert J. Koehler, Secaucus, NJ (US); William E. Koehler, North Bergen, NJ (US); Gerald R. Grispart, Woodbridge, NJ (US); Michel L. Plasse, Ridgewood, NJ (US)

(73) Assignee: Quantum Conveyor Systems, Inc., Northvale, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/583,385

(22) Filed: May 30, 2000

Related U.S. Application Data

(62) Division of application No. 08/797,025, filed on Feb. 7, 1997, now Pat. No. 6,085,892.

(51) Int. Cl.⁷ .............................. B65G 47/19; G06F 7/06
(52) U.S. Cl. ............................. 198/349.95; 198/349.6; 198/349.7; 198/349.8; 198/370.01; 198/370.09; 700/2; 700/230
(58) Field of Search .......................... 198/349.6, 349.7, 198/349.8, 349.9, 370.09, 349.95, 370.01; 700/2, 228, 230; 710/14

(56) References Cited

U.S. PATENT DOCUMENTS

| | | |
|---|---|---|
| 3,134,476 A | 5/1964 | Pierson et al. |
| 3,136,430 A | 6/1964 | Zuercher |
| 3,232,409 A | 2/1966 | Pierson et al. |
| 3,329,251 A | 7/1967 | Bilocq |
| 3,351,217 A | 11/1967 | Sassen et al. |
| 3,490,573 A | 1/1970 | Pierson et al. |
| 3,710,917 A | 1/1973 | Black et al. |
| 3,805,954 A | 4/1974 | Sutton et al. |
| 4,120,629 A | 10/1978 | Christian et al. |
| 4,293,924 A * | 10/1981 | Struger et al. ................. 710/14 |
| 4,511,030 A | 4/1985 | Lem |
| 4,688,166 A * | 8/1987 | Schneider ..................... 710/45 |
| 4,696,386 A | 9/1987 | Lem |
| 4,876,664 A | 10/1989 | Bittorf et al. |
| 4,896,256 A * | 1/1990 | Roberts ....................... 710/129 |
| 5,125,783 A | 6/1992 | Kawasoe et al. |
| 5,325,972 A | 7/1994 | Prydtz et al. |
| 5,399,531 A | 3/1995 | Wu |
| 5,536,128 A | 7/1996 | Shimoyashiro et al. |
| 5,641,056 A | 6/1997 | Lem |
| 5,984,498 A * | 11/1999 | Lem et al. ..................... 700/2 |

FOREIGN PATENT DOCUMENTS

| | | |
|---|---|---|
| EP | 392621 | 10/1990 |
| EP | 569073 A1 | 11/1993 |
| NL | 169852 | 11/1980 |
| NL | 7903710 | 11/1980 |
| NL | 9401349 | 4/1995 |

* cited by examiner

Primary Examiner—James W. Keenan
Assistant Examiner—Thuy V. Tran
(74) Attorney, Agent, or Firm—Peter J. Manus; William J. Daley, Jr.; Dike, Bronstein, Roberts & Cushman

(57) ABSTRACT

Featured is a sorting/diverting apparatus that diverts articles from a plurality of moving belts, the sorting/diverting apparatus including a plurality of rollers that are rotatably mounted to a support frame and a moving mechanism that moves the support frame back and forth between two positions. The controller controls the moving of the support frame and the operation of the drive motor so as to divert/sort the articles. Each controller includes bi-directional communications ports, a processor that processes information and provides outputs, and an applications program for execution within the processor that includes instructions and criteria for processing the information and providing the processor outputs to control the apparatus.

14 Claims, 16 Drawing Sheets

HIGH SPEED SORTING/DIVERTING APPARATUS, AN APPARATUS CONTROLLER AND SYSTEMS USING SAME

This application is a divisional of U.S. application Ser. No. 08/797,025, filed Feb. 7, 1997, now U.S. Pat. No. 6,085,892, the teachings of which are incorporated herein by reference.

FIELD OF INVENTION

The present invention relates to device controllers and operating methods therefor and more particularly conveying systems employing such controllers locally.

BACKGROUND OF THE INVENTION

There is described in U.S. Pat. No. 4,696,386, a diverter turn assembly that can be configured to divert articles from a path of a conveying system to another path, to merge articles arriving on two paths into one path or to function as a corner section. Such a turn assembly includes an array of wheels or rollers mounted on a frame. The wheels or rollers are arranged so continuously moving belt(s) on which the articles travel pass freely through the array. The wheels or rollers of the turn assembly are normally disposed beneath the surface of the belts and raised pneumatically when required to change the direction of the moving product or article. The rollers for the corner sections are typically arranged so they always present a contact surface slightly higher than the belts. The orientation and shape of the wheels is adjusted to match the function to be formed (e.g., diversion, merger, turning at a corner). For example, for a merge unit the rollers are orientated across the belt line.

Although such a device can readily divert and turn articles, it is limited to a single change in direction for diversion or merging (i.e., "T" conveying system configurations). This increases the size and number of sections required to divert and/or merge articles. Although this device also is well suited for diverting and merging articles in conveying system, it has limited capability to sort articles in particular when performing high speed sorting operations.

The universal controller for this device, as described in co-pending U.S. application Ser. No. 08/752,587 now U.S. Pat. No. 5,984,498, is well suited to control the performance of the diverting and merging functions by the device. However, it also has limited capability to perform sorting operations, in particular high speed sorting operations. As also described therein, this controller uses a local area communication scheme to control the operation of systems or devices connected to the controllers and thereby decentralize these control functions.

Additionally, other existing control systems and control methodologies, particularly those for conveying systems, employ some form of centralized control over multiple device controllers. For example, two device controllers are hard wired inter-connected to a programmable logic controller (PLC) or a plurality of PLCs, each being hardwired to device controllers, are hard wired connected to another central PLC. To effect a change in the operation of one device in response to changing conditions for another device, the PLC identifies the changing conditions and sends a signal to the other controller.

Such other systems are difficult to modify in the field by the user (i.e, not user friendly). System modifications typically involves re-configuring or replacing each control component (i.e, controller and PLC) in the system. As such, these types of systems are expensive and time consuming and have little flexibility for field modification.

Conveying and sorting systems traditionally have been custom designed with centralized controls and complex customized software for tracking articles or goods in movement in the system. Modifications to such systems entail adjustments to the centralized controls, revision to the customized software and the de-bugging required following such changes to assure proper system operation. Further, because the software and controls for each system is customized for each system, it is difficult to combine the control logic with the mechanical of the conveying system.

As such, there is a need for an apparatus that is configurable to selectively and automatically perform uni-directional and/or bi-directional sorting and diverting of articles. More particularly an apparatus that can perform high speed uni-directional and/or bi-directional diversion and sorting. There also is a need for such a controller to communicate with each other on a local area basis. Additionally, there is a need for a controller which is particularly configured to support the high speed sorting and/or diverting capability of the sorting/diverting apparatus. Such controllers also should not require hard wired interconnections but use communication protocols and equipment as a means for communicating between controllers. There also is a need for a sorting system that uses one or a plurality of such apparatuses. There also is a need for a conveying system that uses such an apparatus in conjunction with other conveying sections using local area based communication schemes and controllers so as to increase flexibility while maintaining control over the flow of goods or articles through the system without centralized control and customized software. Moreover, there is a need for conveying and sorting systems that are modularized in design and operation so customized engineering is not required.

SUMMARY OF THE INVENTION

The present invention features an apparatus that is configurable to selectively and automatically perform uni-directional and/or bi-directional diverting of articles being transported on a plurality of moving belts. Such an apparatus can be used in conveying systems to divert articles being transported in up to two directions. The apparatus also is particularly suited for performing high speed uni-directional and/or bi-directional sorting of these articles. Also featured is a controller or device that controls one or more of such apparatuses and systems using such an apparatus and controller.

In specific embodiments, the sorting/diverting apparatus diverts articles that are being conveyed on a plurality of moving parallel moving belts at a preselected nominal base height. The preselected nominal base height also corresponds to the top of the moving belt. The apparatus includes a plurality of diverting shafts, a shaft support frame, a frame moving mechanism, a drive motor and a drive mechanism.

The plurality of diverting shafts each have a long axis and are rotatably mounted to the shaft support frame. In a particular embodiment each diverting shaft is a hollow aluminum tube with a urethane coating to improve gripability. Each diverting shaft is substantially parallel to the plurality if moving belts. In particular embodiments, the number of diverting shafts is one more than the number of moving belts and includes a pulley, or a toothed pulley, mounted at one end thereof.

The drive mechanism interconnects each of the diverting shafts to the drive motor so that rotation of the drive motor causes each of the diverting shafts to rotate in a predetermined direction and speed. In a particular embodiment, the drive motor and drive mechanism cooperate so the plurality of diverting shafts are selectively and simultaneously rotated in either a clockwise or counterclockwise direction. More particularly, the drive motor is a reversible electrical motor, e.g., a reversible DC electrical motor, that causes the diverting shafts to rotate in the clockwise and counterclockwise directions.

In a more specific aspect of the instant invention, the drive motor includes a drive pulley, preferably a toothed drive pulley being interconnected to the motor drive shaft. The drive mechanism includes a drive belt, e.g. a continuous drive belt, and at least one idler wheel or idler pulley that is mounted to the shaft support frame. The drive belt is passed or wound about each of the diverting shaft pulleys, the drive pulley and each of the idler pulleys in a serpentine fashion. In this way, rotation of the drive pulley results in the simultaneous rotation of the diverting shafts. The at least one, preferably two, idler pulleys maintain tension in the drive belt as the support frame is being moved back and forth between first and second positions as hereinafter described.

The frame moving mechanism selectively moves the shaft support frame back and forth between the first and second position. In the first position, the frame moving mechanism arranges the support frame so the top of each diverting shaft is disposed below the preselected base height, i.e., is below the top surface of the moving belt. In the second position, a portion of each diverting shaft is disposed above the preselected base height to raise an article that was traveling along the plurality of moving belts so the article is no longer in contact with, and thus not moving along, the moving belts.

The shaft support frame further includes two end plates, on which each of the plurality of diverting shafts is rotatably secured thereto. Each plate includes two through apertures in the opposing surfaces of the two end plates. These through apertures are oval in configuration with the major axis of the aperture being parallel to the plane in which the plurality of moving belts lie. The through apertures in one end plate are aligned with the through apertures in the other plate.

The frame moving mechanism includes a plurality of stepping shafts, a second drive motor, and a second drive mechanism. The second drive mechanism interconnects each of the stepping shafts to the second drive motor so that rotation of that motor causes each of the stepping shafts to rotate about 180° in a predetermined direction. The second drive motor and second drive mechanism also cooperate so the plurality of stepping shafts are selectively and simultaneously rotated in either a clockwise or counterclockwise direction.

Each stepping shaft includes a pin extending outwardly from each end of each shaft (i.e., two pins per shaft). In this way, the long axis of the pin is essentially parallel to the long axis of the shaft. Additionally, the pins are eccentrically mounted to each end at corresponding tangential positions. Each stepping shaft is disposed between the two end plates so the pins at either end of the shaft are disposed in one of the apertures in each of the two end plates and slidably engage the interior surface of the through aperture.

When the second drive motor rotates in one direction, the pins rotate in a generally upwardly direction. Because the pins slidably engage the interior surfaces of the through apertures, this rotation causes the end plates, and correspondingly the diverting rollers secured thereto to move upwardly. In this way, at least a portion of the rollers are disposed above the drive belts. However, when the second drive motor is rotated in another direction (e.g., clockwise), the pins are rotated in a generally downwardly direction. This downward motion causes the end plates as well as the diverting rollers to move downwardly so the rollers are disposed below the surface of the moving belts. Thus, the diverting rollers and the associated support frame are thereby selectively moved back and forth between the first and second positions.

In more particular embodiments, the second drive mechanism includes a drive pulley or sprocket for the second drive motor, a pulley or sprocket for each stepping shaft and a chain. The drive motor sprocket rotates responsive to the rotation of the motor. Each stepping shaft sprocket is mounted about a stepping shaft so rotation of the sprocket causes the stepping shaft to rotate. The chain is wound or passed about the drive motor sprocket and the stepping shaft sprockets so the rotation of the drive motor causes the stepping shafts to rotate in the same direction simultaneously and at a predetermined speed.

The drive motor is a quarter turn air operated rotary actuator under the control of a four way air valve. The air valve controls the air being admitted to the air actuator so it is selectively rotated in either a clockwise or counterclockwise direction. In an exemplary embodiment, the rotary actuator includes a vane on either side of which are ports for admission of pressurized air and for venting air. Rotation of the vane in either the clockwise and counterclockwise direction is accomplished by the appropriate admission of pressurized air to one side of the vane and venting pressurized air from the other side.

In another aspect of the instant invention, the sorting/diverting apparatus further includes a control device that selectively controls the operation of the frame moving mechanism and correspondingly the movement of the frame between and among the first and second positions. More particularly, the control device provides outputs to control the operation of second drive motor to move the support frame between the first and second positions. In a specific embodiment, the control device controls the operation of the four-way air valve and thereby the admission of and the venting of pressurized air to/from the air operated rotary actuator.

In a second aspect of the instant invention, the control device controls the operation of the diverting shaft drive motor and associated drive mechanism. More specifically, the drive motor is controlled so each of the diverting shafts is rotated in a predetermined direction at least when the portion of the diverting shaft is disposed above the nominal base height. When the sorting/diverting apparatus of the instant is configured to perform bi-directional diversion or sorting, the control device controls the operation of the diverting shaft drive motor so the diverting shafts are selectively rotated in a clockwise or counterclockwise direction.

In a third aspect of the instant invention, the control device is a novel apparatus controller that includes at least one, or at least two, bi-directional inflow and outflow communications ports, a processor and an applications program for execution with the processor. The processor processes information and provides outputs, where at least one output controls the device. The applications program includes instructions and criteria for processing the information and providing processor outputs. Specifically, the applications program includes instructions and criteria for communicating information between and among controllers;

instructions and criteria for processing information received by a controller; instructions and criteria for modifying the operation of an apparatus responsive to the communicated information; instructions and criteria for modifying the operation of an apparatus responsive to status information relevant to apparatus operation; and for providing outputs for visual status displays and warning devices. In a preferred embodiment, such an apparatus controller is configured so one controller separately controls the operation of two sorting/diverting apparatuses as hereinabove described.

The apparatus controller further includes a read/write memory for storing data and parameters that control the operation of the applications program. The applications program also further includes instructions and criteria for controlling data storage in the read/write memory as well as instructions and criteria for real time tracking of data related to operation of the apparatus and system performance.

To communicate information between and among the controllers of the system, a communications link is established between each pair of controllers. This link is established by electrically interconnecting one bi-directional outflow port of one controller to one bi-directional inflow port of another controller.

The controller of the instant invention may be programmed or re-programmed by means of the RS232 I/O port or by means of the communications network established by the electrically interconnected controllers. To effect programming/re-programming of a controller via the communications links, the applications program further includes instructions and criteria for reprogramming the processor/controller responsive to instructions and information communicated through a bi-directional inflow port.

In a fourth aspect of the instant invention, the apparatus controller receives an input from a tick signal generator that provides a periodic output signal representative of the motion of the drive belt over a unit of time. The periodic signals from the tick generator are used by the applications program to control the operation of the apparatus. For example, the signals are used to update the position of the article in the data table which in turn is used to determine when to raise the diverting shafts to divert the article in the appropriate direction. When there are a plurality of such controllers in a conveying or sorting system, the periodic tick signals from the tick generator are communicated from the controller receiving the periodic signal input to the other apparatus controllers of the system.

In a fifth aspect, the instant invention includes a sorting system including at least one sorting/diverting apparatus, at least one apparatus controller and at least one tick signal generator all as hereinabove described. When the system includes a plurality of sorting/diverting apparatuses, there is at least one apparatus controller for each sorting/diverting apparatus and preferably there is one apparatus controller for each pair of sorting/diverting apparatuses.

Such a system also includes at least one display for each direction of sortation or diversion provided. Each of the displays includes a alphanumeric readout to display status information, e.g., the number of items that have been being diverted or sorted. The display further includes a warning device, such as signal lamp, which provides an indication of the satisfaction of some preset condition. For example, an indication that a preset number of items have been sorted into a box. The apparatus controller would also be typically configured to stop sending any further items to this box because it would be considered full.

The display also includes at least one and preferably two buttons or switches for purposes of resetting certain apparatus controller functions. As indicated one function of the sorting/diverting apparatus could be to fill a box. These buttons or switches provide the mechanism by which a user can reset the controller and related counters to continue sorting/diverting after the user has resolved or eliminated the warning condition. For example, put an empty box in place of the full box.

The system further includes at least one sensing mechanism, such as a photo eye to detect the presence of an article, e.g., box, entering onto a section including at least one sorting/diverting apparatus of the instant invention. The sensing mechanism is used to locate the article at a predefined position for purposes of tracking the article as it passes through the section. Such sensing mechanisms also can be used to provide a positive indication that an article was properly diverted. As such, an apparatus controller according to the instant invention has the capability of receiving inputs from each of these sensing mechanisms, e.g., includes five inputs.

In a sixth aspect, the instant invention includes a conveying system that utilizes a multiplicity of different section types to transport articles in a controlled manner. For example, the conveying system of the instant invention may include straight sections, accumulation sections, spacer sections, index sections, alternative conveying system diverter sections and merge sections. For details regarding these conveying system sections and the associated section controller, reference shall be made to U.S. patent application Ser. No. 08/752,587, the teachings of which are incorporated herein by reference. In a more specific embodiment, such a conveying system includes at least one high speed sorting/diverting apparatus of the instant invention. Each of these conveying system sections include a controller for that section.

For the straight sections, accumulation sections, spacer sections, index sections, alternative conveying system diverter sections and merge sections, hereinafter conveying system sections, the applications program in each conveying section controller, preferably includes the instruction and criteria to control the operation of any of these different section types. The applications program accesses the control routines specific to the operation of a given type of conveying section (e.g., an index section) by evaluating the data and configuration parameters stored in the read/write memory. For example, the section type is a parameter that is stored in a data table set up in the read/write memory. The applications program for the sorting/diverting apparatus controller is as described above.

In operation, data relating to the articles on the various sections making up the conveying system is stored in the read/write memory for a given controller. The applications program also further includes instructions and criteria for real time tracking of articles on each conveying section. Thus, a remotely located host computer, using the communications network established between and among the controllers, can make an inquiry to any controller for such real time information. Further, when articles are transferred from an upstream conveying section to a downstream section, the data stored in the read/write memory of the upstream controller is communicated to the downstream controller.

As described above, local displays are provided for each sorting/diverting apparatus controllers, where the number of displays being provided is a function of the number of apparatuses being controlled by the apparatus controller and whether the apparatus is uni-directional or bi-=directional.

For example, four displays are provided for a controller which is controlling two bi-directional sorting/diverting apparatuses.

BRIEF DESCRIPTION OF THE DRAWING

For a fuller understanding of the nature and desired objects of the present invention, reference is made to the following detailed description taken in conjunction with the accompanying drawing figures wherein like reference character denote corresponding parts throughout the several views and wherein.

DESCRIPTION OF THE PREFERRED EMBODIMENT

Figure 1:
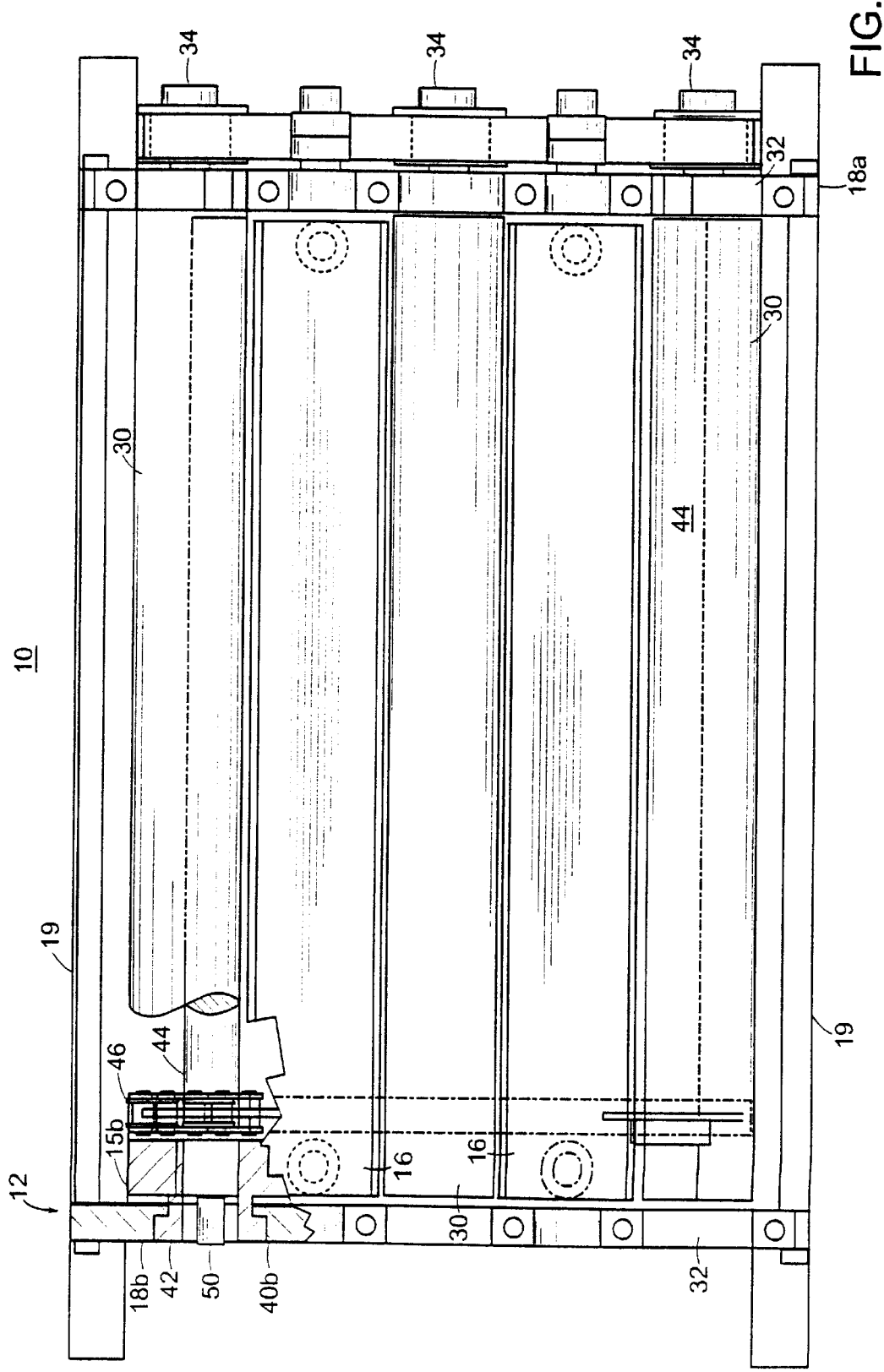
FIG. 1 is a plan view of a sorting/diverting apparatus according to the instant invention with a partial cross-sectional breakaway.
Figure 2:
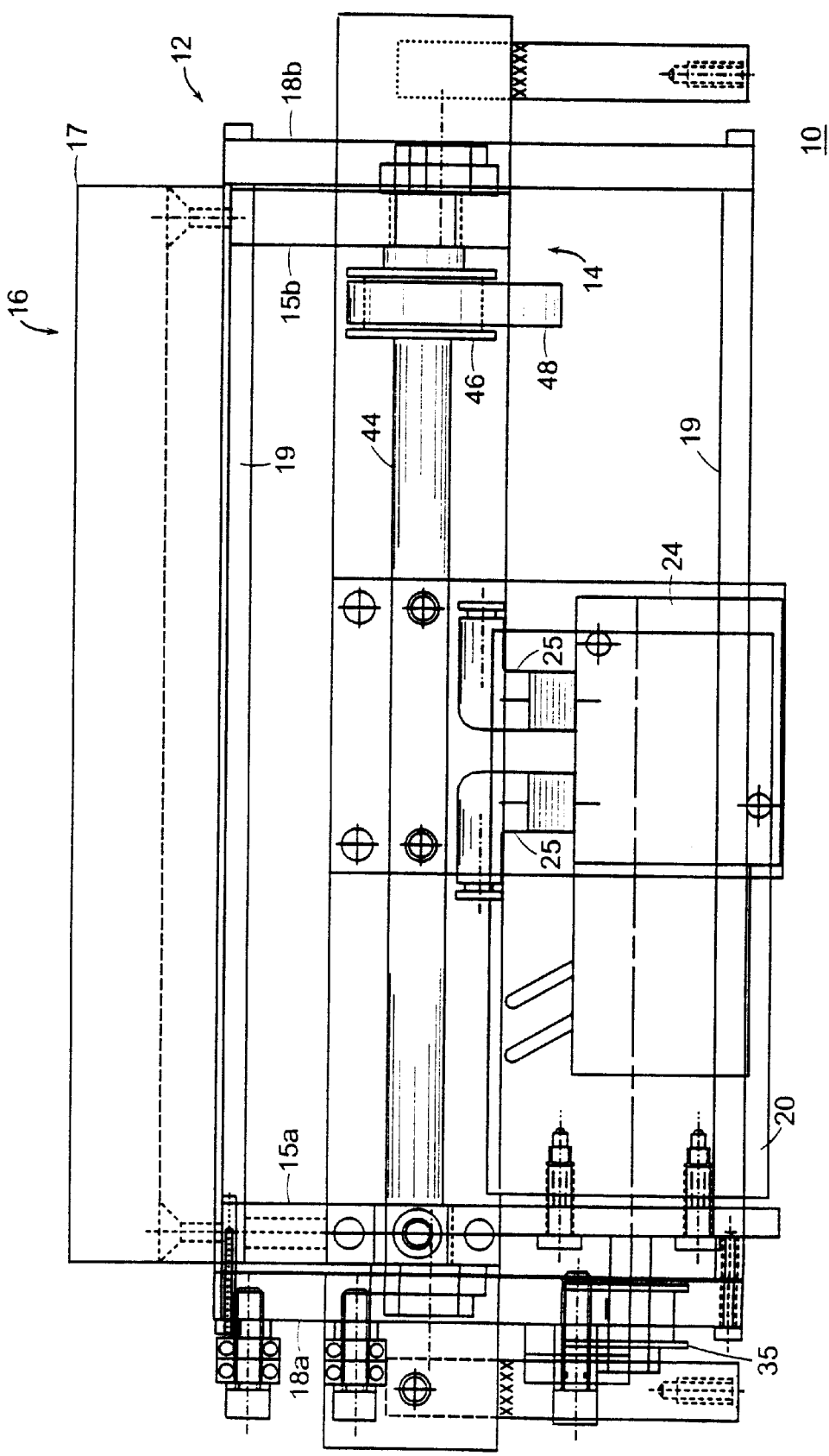
FIG. 2 is a side view of a sorting/diverting apparatus of FIG. 1.
Figure 3:
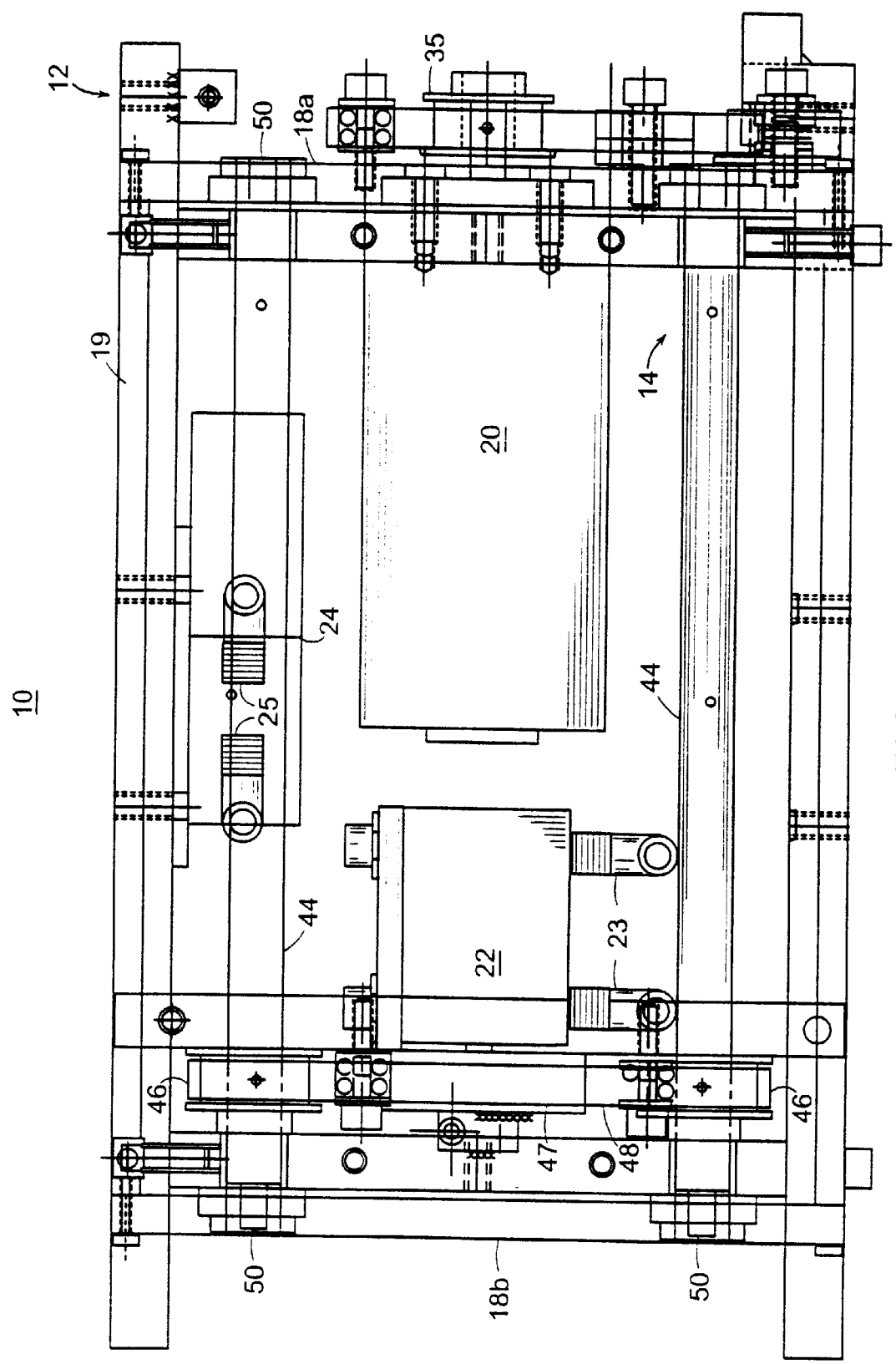
FIG. 3 is a bottom view of the sorting/diverting apparatus of FIG. 1.

Referring now to the various figures of the drawing wherein like reference characters refer to like parts, there is shown in FIGS. 1–3 a plan, side and bottom view, respectively, of a sorting/diverting apparatus 10 according to the instant invention. The sorting/diverting apparatus 10 includes a moveable support frame 12 and a fixed support frame 14. FIG. 1 also includes a partial cross sectional breakaway view to better illustrate the inter-relationship between the moveable frame 12, the fixed support frame 14 and the mechanism that moves the movable frame up and down. The fixed support frame 14 is secured to legs (not shown) or other means known to those skilled in the art for supporting the apparatus 10 in spaced relation from a floor. The apparatus 10 also is positioned so it is at the appropriate height for proper operation of the plurality of moving belts that pass through the channels 16. The channels 16 are typically u-shaped, constructed of steel and secured to the fixed support frame 14. The cross-sectional shape of the channels 16 is more clearly seen in any one of FIGS. 4A,B; 5A,B.

The fixed support frame 14 includes two end plates 15a,b and means for keeping these two plates in fixed spaced relation and to which are secured the channels 16 through which are passed the moving belts. Also secured to the fixed support frame 14 is a drive motor 20 for the diverting rollers 30, a rotary actuator 22 and an air valve 24 controlling the rotary actuator.

In an exemplary embodiment, the rotary actuator 22 is an air/gas operated vane type of rotary actuator, such as a Turn-Act Model No. D-32-22 where the vane is rotated back and forth about ¼ turn or 90°. Rotation of the vane is accomplished by admitting pressurized air or gas on one side of the vane and venting air or gas from the other side of the vane. The vane rotates until it contacts a mechanical stop. The vane is maintained against the mechanical stop by the pressurized gas/air. The vane is rotated in the opposite direction in a similar fashion. Alternatively, it should be recognized that any one of a number of rotary motors known to those skilled in the art, such as hydraulic and electric motors, can be used as the rotary actuator 22.

The rotary actuator 22 also includes air lines 23 that are fluidly interconnected to the air lines 25 of the air valve by means of tubing or piping (not shown) as is known to those skilled in the art. The air valve 24 preferably is a four way spool type of air valve that selectively interconnects a pressurized gas source and a vent line to the rotary actuator 22. In an exemplary embodiment, the air valve can be any one of a number of commercially available four way air valves such as a Humphrey Model No. 420-36. The exemplary embodiment of the air valve 22 is responsive to an electrical signal input that is representative of the valve configuration. This not a limitation as the air valve can be configured so it is operated using any one of a number of techniques known to those skilled in the art, e.g., the valve can be an air operated valve.

The moveable frame 12 includes two end plates 18a,b and a plurality of spacer rods 19 that extend between opposing surfaces of the end plates. The rods 19 are secured to the end plates, e.g., bolted, so as to keep the end plates in a fixed and spaced relationship to each other. As shown in FIGS. 1–2, two rods are secured along the vertical edges of the end plates 18a,b so as to form the sides of the moveable frame 12. In a preferred embodiment, the end plates 18a,b and the rods 19 are constructed of aluminum. However, the end plates 18a,b and/or rods 19 can be constructed of any material having sufficient rigidity and strength for the intended use. The materials of choice also involve considering the effects inertia have on moving the moveable frame 12 back and forth between the up and down positions (e.g., see FIGS. 4A,B). For example, the end plates and/or rods can be manufactured from titanium.

Two stepping shafts 44 are provided that extend between the two moveable frame plates 18a,b as is more clearly shown in FIGS. 2–3. Each stepping shaft 44 includes a sprocketed wheel 46 proximate the front end plate 18b of the moveable frame 12. The sprocketed wheels are secured to the stepping shafts so that rotation of the sprockets also cause the shafts to rotate.

A sprocketed wheel 47 also is secured to the output of the rotary actuator 22. The stepping shaft sprocketed wheels 46 and the actuator sprocketed wheel 47 are rotatably interconnected by means of a chain 48 so the stepping shafts are simultaneously rotated in the same direction at the speed. The sprocketed wheels 46,47 and the stepping shafts in a specific embodiment are made from steel.

The diameter of the actuator sprocketed wheel 47 in a specific embodiment, is dimensioned with an about two to one ratio with respect to the stepping shaft sprocketed wheels 46 (i.e., two revolutions of stepping shaft sprocketed wheel for each revolution of actuator sprocketed wheel). Thus, a quarter turn of the actuator 22 results in a ½ turn of each stepping shaft 44.

Figure 4A:
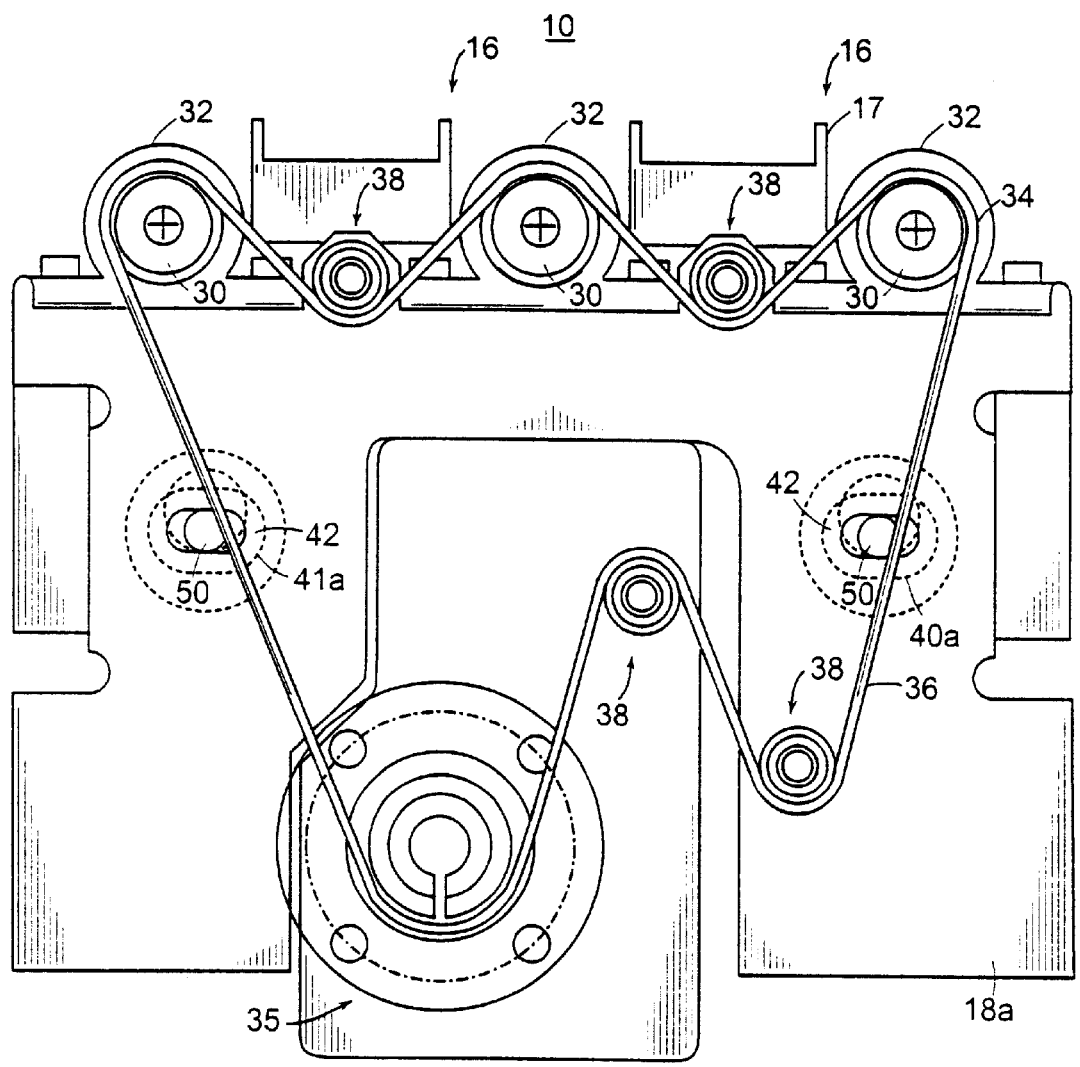
FIG. 4A is a back view of the sorting/diverting apparatus of FIG. 1 with the diverting rollers down.
Figure 5A:
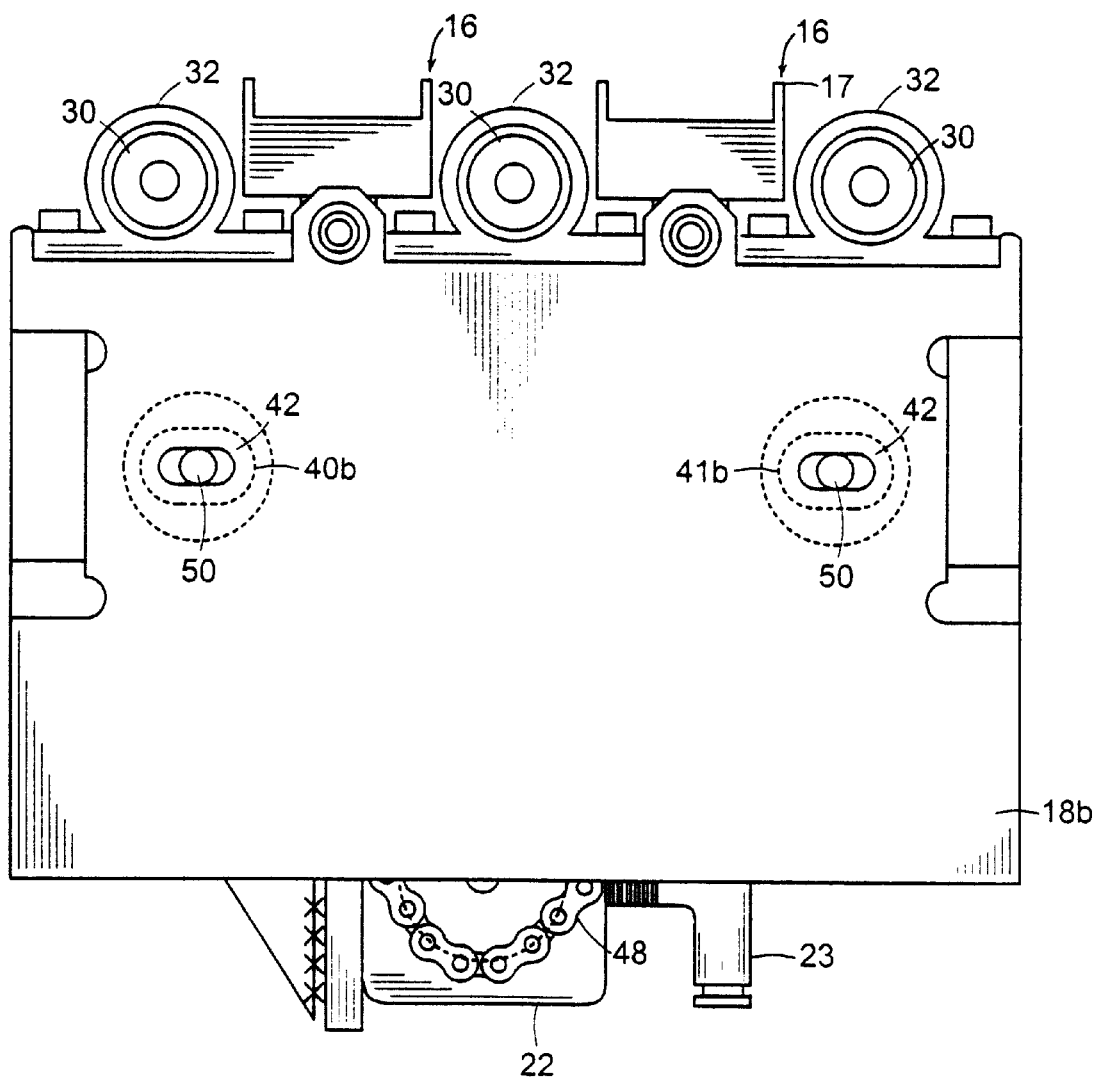
FIG. 5A is a front view of the sorting/diverting apparatus of FIG. 1.

Each of the moveable frame end plates 18a,b include two through apertures 40a,b;41a,b in the opposing vertical surfaces as more clearly shown in FIGS. 4A,B and FIG. 5A and the partial cross-sectional breakaway of FIG. 1. An insert or bushing 42 (FIG. 1), having an oval through aperture, is inserted into each of the plate through apertures 40a,b; 41a,b. Each bushing 42 also extends above or beyond the inside surface of the end plates thereby establishing a thrust bearing surface, where the flat end portions of each stepping shaft 44 ride up against the thrust bearing surface.

Figure 5B:
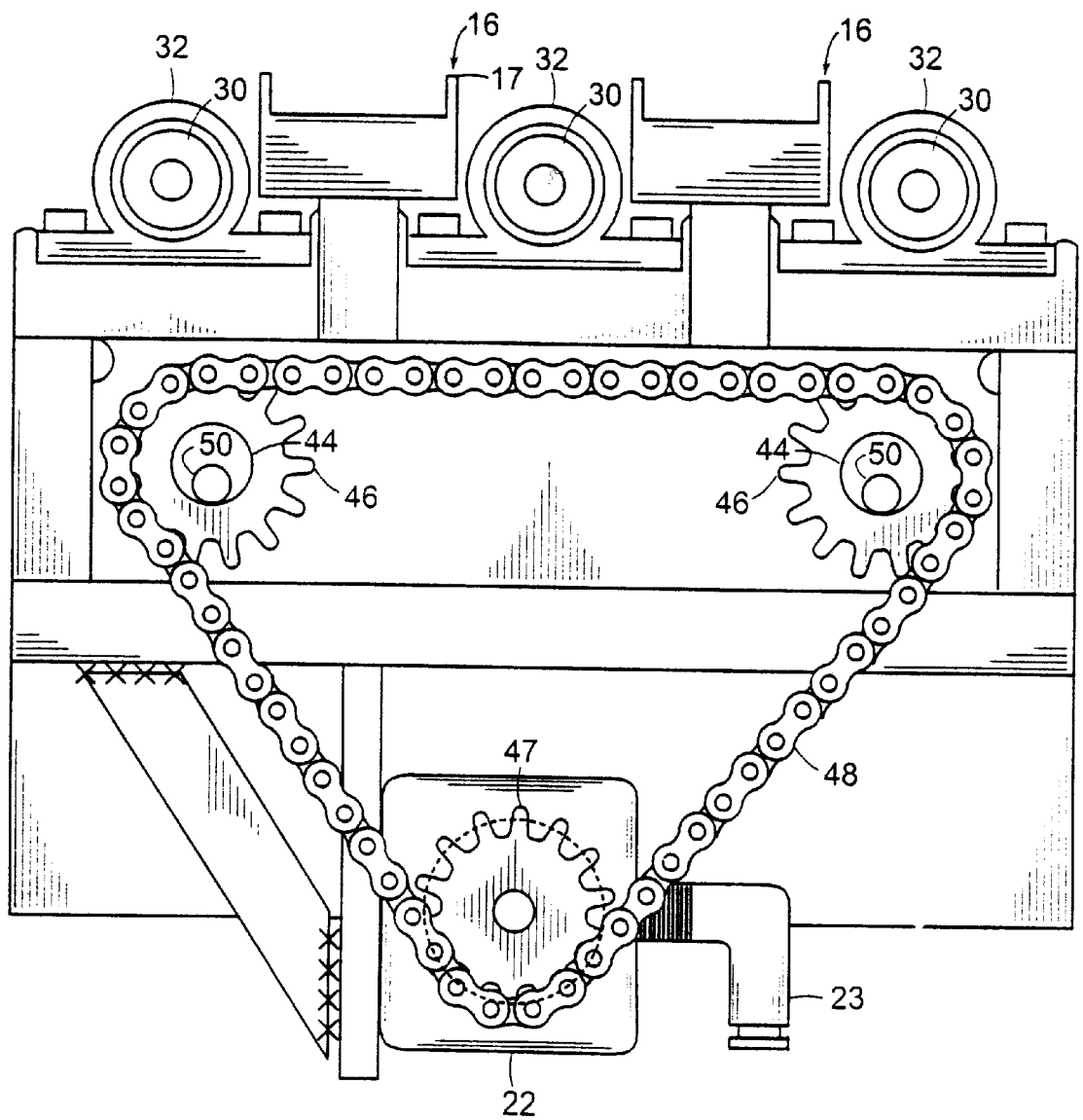
FIG. 5B is a front view of the sorting/diverting apparatus of FIG. 1 with the front plate of the roller support frame removed.

A pin 50 is eccentrically mounted to each end of the stepping shafts 44, as is shown in FIG. 5B and illustrated by means of the hidden lines in FIG. 5A and FIGS. 4A,B, so as to be generally parallel to the long axis of a stepping shaft. Each pin 50 is slidably disposed in one of the through apertures 40a,b; 41a,b in the moveable frame end plates 18a,b.

When the stepping shafts 44 are rotated in one direction, the rotation causes all the pins 50 to move in a generally upwardly direction at the same speed and direction. As the pins move upwardly they engage the top interior surface of the through apertures. This upwardly motion also causes an upwardly motion of the moveable frame 12. Correspondingly, when the stepping shafts are rotated in an opposite direction, the pins 50 and the moveable frame 12 move in a generally downwardly direction and the pins engage the lower surface of the through aperture. The relative position of the pins 50 with respect to the ends of a stepping shaft 44, when the moveable frame is in a full down or in a full up position, is illustrated in FIGS. 4A,B respectively (i.e., frame is moved respectively between two positions).

The apparatus 10 also includes a plurality of diverting rollers 30 that are rotatably secured to the moveable frame 12 by a bearing or bushing assembly 32. Each diverting roller 30 is rotatably secured by a pair of bushing assemblies 32 so as not to move in either an axial or radial direction. In this way, the diverting rollers 30 are essentially parallel to the channels 16 and correspondingly essentially parallel to the long axis of the moving belts.

Although three diverting rollers 22 are shown with two channels 16 this is not a limitation, as there can be any number and combination of rollers and channels or belts. In particular embodiments, the apparatus 10 may be configured so there are three rollers and two channels or belts, four rollers and three channels, five rollers and four channels, six rollers and five channels and seven rollers and six channels. The number of rollers and channels typically are established based on the size of the article being diverted and sorted (e.g., for wide articles use large numbers of roller and belts (i.e., channels). The length of the rollers also can be established or adjusted to accommodate different product or article lengths. In general the number of rollers and belts typically satisfy the following condition, $Num_{rol}=Num_{blt}+1$.

As shown in FIG. 1 and FIGS. 4A,B, the apparatus further includes a plurality of drive pulleys 34, each pulley 34 being secured to one end of each diverting roller 30, a motor drive pulley 35, and a drive belt 36. The above are disposed proximate the moveable frame back end plate 18a.

Figure 4C:
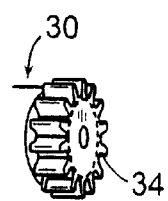
FIG. 4C is a isometric view of the pulley end of a diverting roller of FIGS. 1,2A.

In a particular embodiment, the drive belt 36 is a toothed drive belt of a synthetic material such as neoprene with kevlar cords and the drive pulleys 34,35, respectively for the diverting rollers 30 and the drive motor 20, are toothed drive pulleys. For example, the toothed roller drive pulley 34 as is shown in FIG. 4C. The drive belt 36 is passed or wound about the drive pulleys 34,35 so the rotation of the drive motor cause the drive pulleys to simultaneously rotate in the same direction and speed.

The apparatus preferably further includes a plurality of idler wheels 38 rotatably secured to both the moveable frame 12 and the fixed frame 14. Also, as illustrated in FIGS. 4A,B, the drive belt 36 is wound about the drive pulleys 34,35 and the idler wheels in a serpentine fashion. The idler wheels 38 are configured, in any of a number of fashions known to those skilled in the art, to maintain a nominal tension in the drive belt.

Figure 4B:
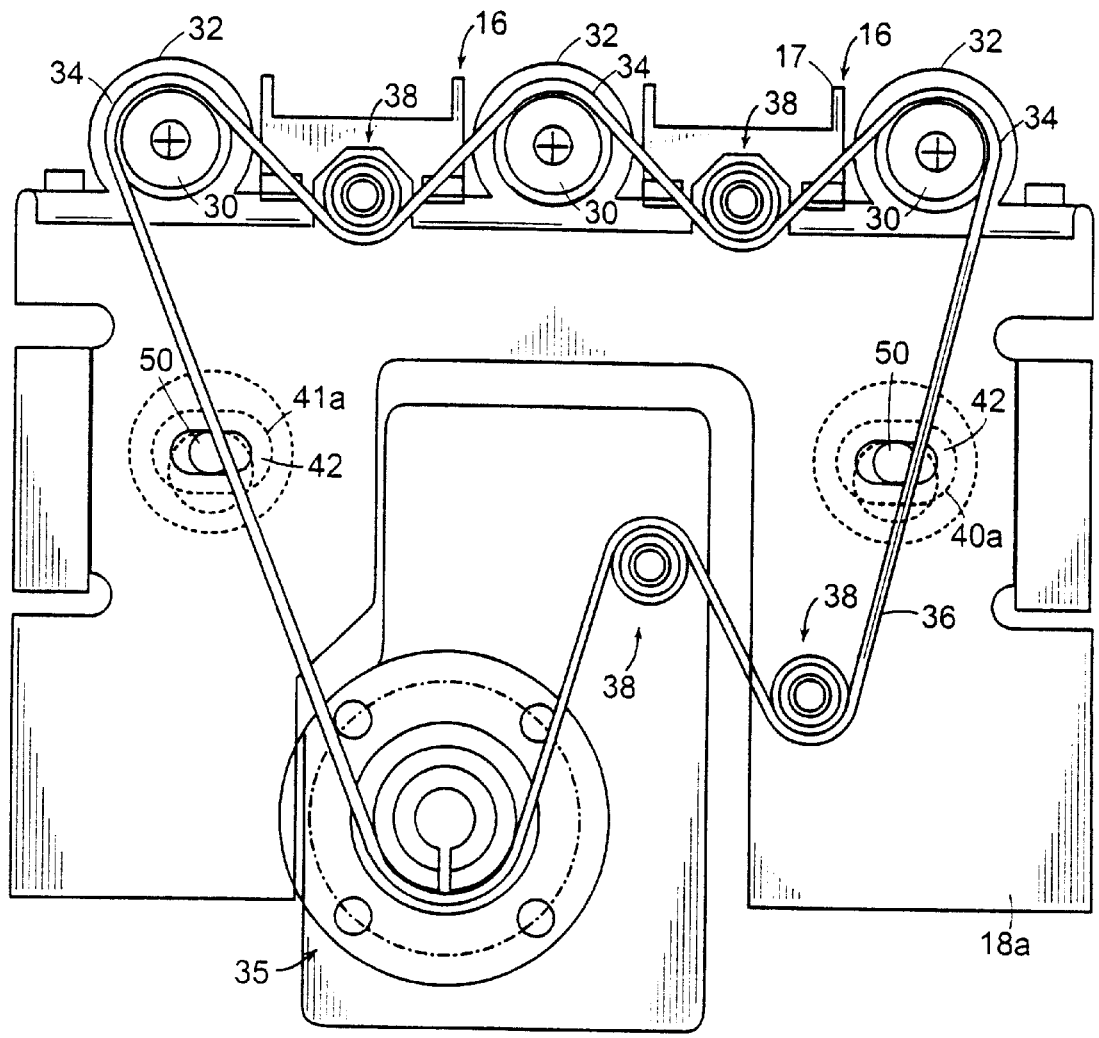
FIG. 4B is a back view of the sorting/diverting apparatus of FIG. 1 with the rollers up.

Because the diverting rollers 30 are secured to the moveable frame 12, they also move upwardly or downwardly responsive to the rotation of the stepping shafts 44. More particularly, the diverting rollers 30 are disposed below the top edge 17 of the channels 16 when the moveable frame 12 is in the full down position as shown in FIG. 4A. Correspondingly, at least a portion of the diverting rollers 30 is disposed above the top edge 17 of the channels 16 when the moveable frame 12 is in the full up position as shown in FIG. 4B and, thus is above the top is surface of the moving belts. The idler wheels 38 also are configured to maintain a nominal tension in the drive belt 36 as the moveable frame is moved respectfully between the full-down and full-up positions.

The drive motor 20 is a reversible fractional horsepower DC electrical motor so the motor's rotor can be rotated in a clockwise or counterclockwise direction. In this way, rotation of the drive motor 20 in one direction causes the diverting rollers 30 to rotate clockwise. Correspondingly, rotation of the drive motor 20 in another direction causes the diverting rollers 30 to rotate in a counterclockwise direction. Thus, the direction of sorting or diverting is controlled by the drive motor.

As described hereinafter, the drive motor 20 is preferably controlled so the drive motor rotates in the desired direction when the diverting rollers 30 are in the moveable frame full-up position. Alternatively, the drive motor 20 is controlled so the diverting rollers 30 are rotating as the moveable frame 12 is being raised to the full-up position. Also, and as described above, when the diverting rollers 30 are in this full-up position, an article traveling along the moving belts is lifted above, and out of contact with, the moving belts by the diverting rollers. By appropriately lifting the diverting rollers 30 and rotating them, the article being lifted is diverted from the original travel path to a new path at or about 90° from the original travel path. Further, because the drive motor 22 can cause the diverting rollers 30 to rotate in either a clockwise or counterclockwise direction, the new travel path can be to the left or right of the original travel path.

In sum, the sorting/diverting apparatus 10 of the instant invention is advantageously configurable to perform unidirectional and/or bi-directional sorting or diverting operations. The apparatus 10 also is constructed so it can repetitively perform these sorting or diverting operations at high speed and under the conditions of high product density. For example, a sorting/diverting apparatus 10 of the instant invention is capable of repetitively and reliably sorting a VCR tape sized package at the rate of up to about 4 packages per second. The can be accomplished when sorting articles of varying weights and dimensions.

Figure 6:
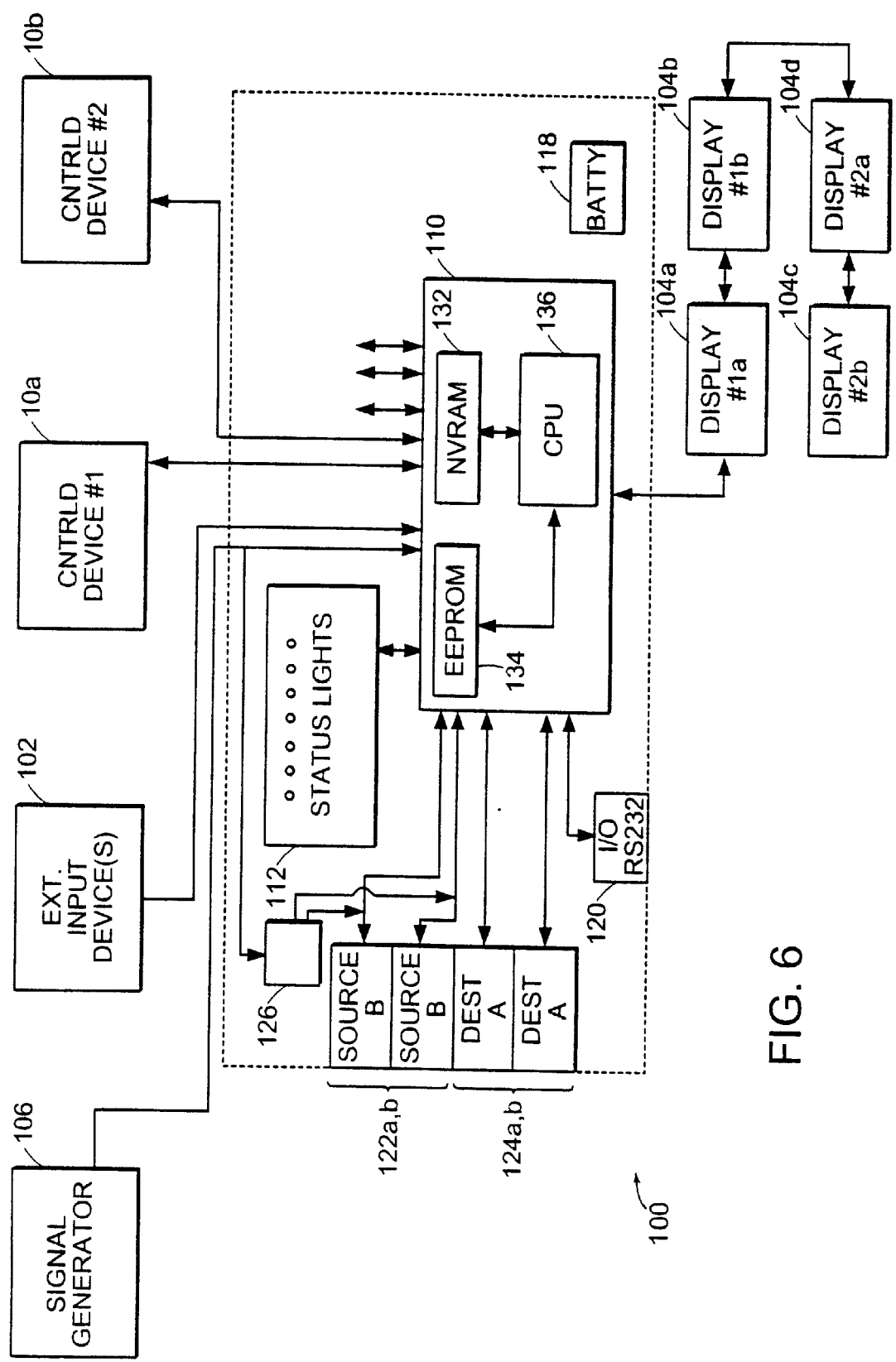
FIG. 6 is a schematic block diagram of an apparatus controller according to the instant invention.

There is shown in FIG. 6, a schematic block diagram of an apparatus controller 100 according to the instant invention that controls the functions and operation of at least one of the above described sorting and diverting apparatus 10. The apparatus controller 100 also can receive input from at least one external sensing devices 102 (FIG. 8), such as a photo-eye, as described hereinafter. In specific embodiments, the apparatus controller 100 of the instant invention controls a plurality of sorting and diverting apparatuses, for example two apparatuses 10a,b. Further, the apparatus controller 100 provides outputs to, and receives inputs from one or more remotely located display devices 104a–d.

The controller 100 of the instant invention, as described hereinafter, is user friendly and easily modified by factory personnel or the users in the field. Instead of one central processor following highly complicated instructions, each controller 100 provides for local area control over the apparatuses and system comprising such apparatuses.

Each apparatus controller 100 is preprogrammed with the control routines required to control one or more of the sorting/diverting apparatuses of the instant invention. More specifically, the control routines control the apparatuses so that each apparatus is operated in a uni-directional or bi-directional sorting/diverting mode or one is operated in a uni-directional mode and the other in a bi-directional mode.

In operation, configuration parameters are programmed and stored in the processor 110 so as to enable the specific control routines required to operate the one or more apparatuses 10a,b interconnected thereto. In addition, to controlling the operation of each apparatus connected thereto, the apparatus controller 100 tracks the position of the boxes, goods or articles traversing the "section" defined by the one or more apparatuses being controlled by a controller and can direct the final destination of specific boxes, articles, etc. That is, at any time each controller 100 is being operated so the identity of each box/article on each section is retrievable by the controller.

Figure 7:
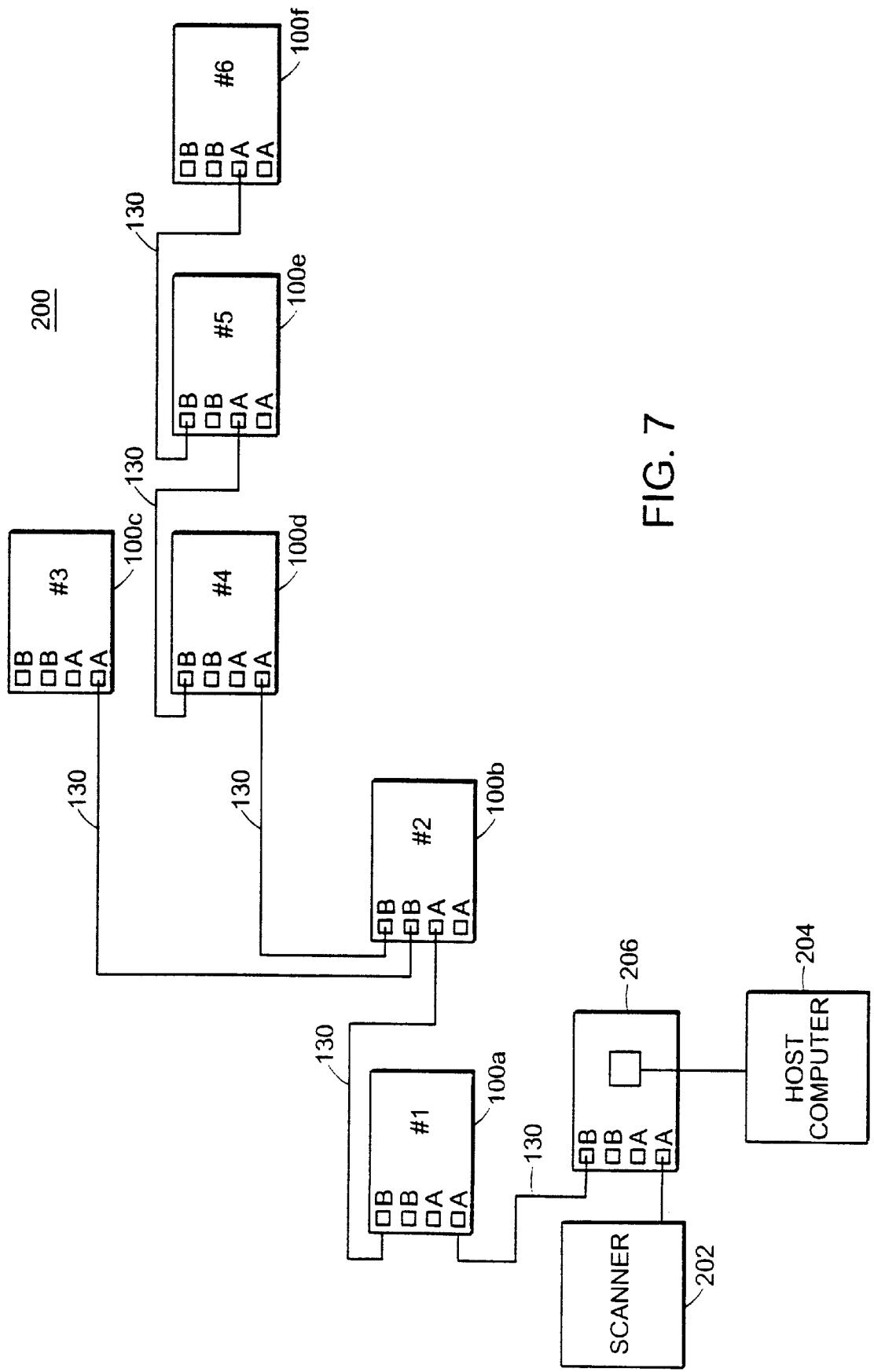
FIG. 7 is a block diagram of an exemplary communications network for controllers of the instant invention.

The controller 100 includes a processor 110, status lights 112, a battery 118 and an RS232 I/O port 120. Also included is at least one two inflow bi-directional communications ports 124a,b and at least one outflow bi-directional communications ports 122a,b. The bi-directional communications ports 122,124 are preferably RS485 connectors with two RJ31X modular connections. The individual controllers 100 are interconnected to each other for bi-directional communications therebetween by means of a twisted eight wire telephone type cable 130 (FIG. 7).

The controller 100 is powered in any of a number of ways. In one embodiment, electrical power is supplied to the controller via the twisted cable 130 (FIG. 7) interconnecting the communications ports 124a,b; 122a,b of each controller. Thus, each of the controllers 100 is powered from a central source. The central power supply provides power in the range of from about 20 Vac to about 52 Vac and preferably is about 24 Vac or about 48 Vac. Alternatively, each controller 100 or a group of controllers are connected to a power supply in the above voltage ranges.

The battery 118 is a 3 V Lithium coin cell or any long-life type of battery known in the art. The battery 118 supplies back-up power to the read/write memory 132 comprising the controller 100 in the event of a power failure so data is retained until power is restored. For a conveying or sorting system application, the information retained includes the article tracking information and configuration parameters for the sorting/diverting apparatuses 10a,b interconnected to the controller. Also included is information concerning the articles or boxes traversing the area under the control of the controller and any sorting or routing instructions for these articles/boxes. Alternatively, or in addition to the battery 118, the controller may use non-volatile memory types that retain information when there is a power failure.

The status lights 112 are a plurality of LED indicators that are intended to help a user troubleshoot the controller 100. The status lights also provide a visual indication of the status of the controller's operation and the outputs from components of the controller such as relays, TRIACS and solid state devices. The lights may flash slowly, flash rapidly or may be lit steadily. For example, the status lights representative of a controller's operability may be lit continuously when the controller 100 is locked up whereas they flash at some rate during normal operation.

Additionally, one or more external input devices 102 can be disposed to sense the product being diverted or sorted. For example a photo-eye can be located in each diverting path from each of the apparatuses (e.g., up to four photo-eyes for two bi-directional apparatuses). These external devices 102 provide a input back to the processor 110 when a product enters a given diverting pathway. In this way, the processor 110 can determine if a proper divert was made, whether an apparatus 10a failed to divert and passed the product on through or whether the apparatus performed an incorrect diverting operation.

The processor 110 can evaluate these inputs to determine if the apparatus 10a is in a failed or faulted condition. The processor 110, as described hereinafter, could provide an output indicating this failed condition and to prevent further operation or action by the failed/faulted apparatus.

Another external output device 104, e.g., photo-eye provides an input to at least the first apparatus controller 100 in a system of such controllers. This input is a positive indication of the presence of a box or article and also locates the box/artical at a known position. The processor 110 using the periodic signal inputs from the signal generator 106 thereafter maintains a positional history log (see FIG. 9 and discussion related thereto) for each article being tracked by the device controller. Using the signals from the photo-eye and the periodic signal inputs, the processor also can develop a length determination for the article in transit. These periodic signals from the signal generator 106 also are buffered in the first controller, e.g., an amplifier 126, and outputted via the outflow bi-directional communications ports 122a,b to other controllers in the system of such controllers.

The RS232 I/O port 120 provides a bi-directional communications interface between the processor 110, including the EEPROM 134 and NVRAM 132, and an external device such as programming terminal or a computer such as an personal computer. The I/O port 120 is one means for inputting the parameters required to configure or re-configure a given controller. As described below, the controller(s) also may be configured/re-configured by a centrally located computer 204 (FIG. 7) that communicates to each controller using the controller communications network 200 (FIG. 7).

Figure 11A:
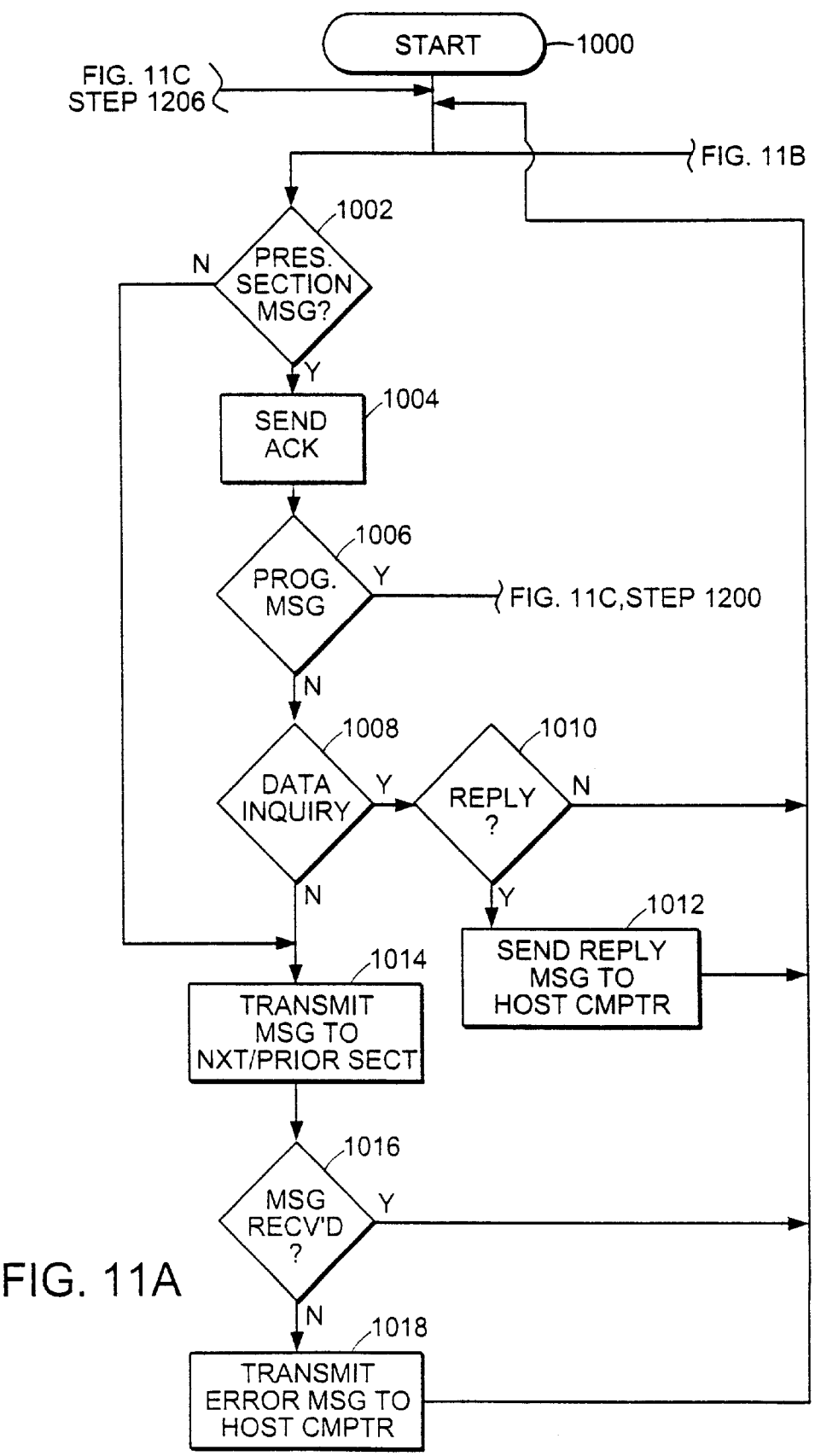
FIGS. 11A–C is a flow diagram of the control logic for a controller according to the instant invention.
Figure 11B:
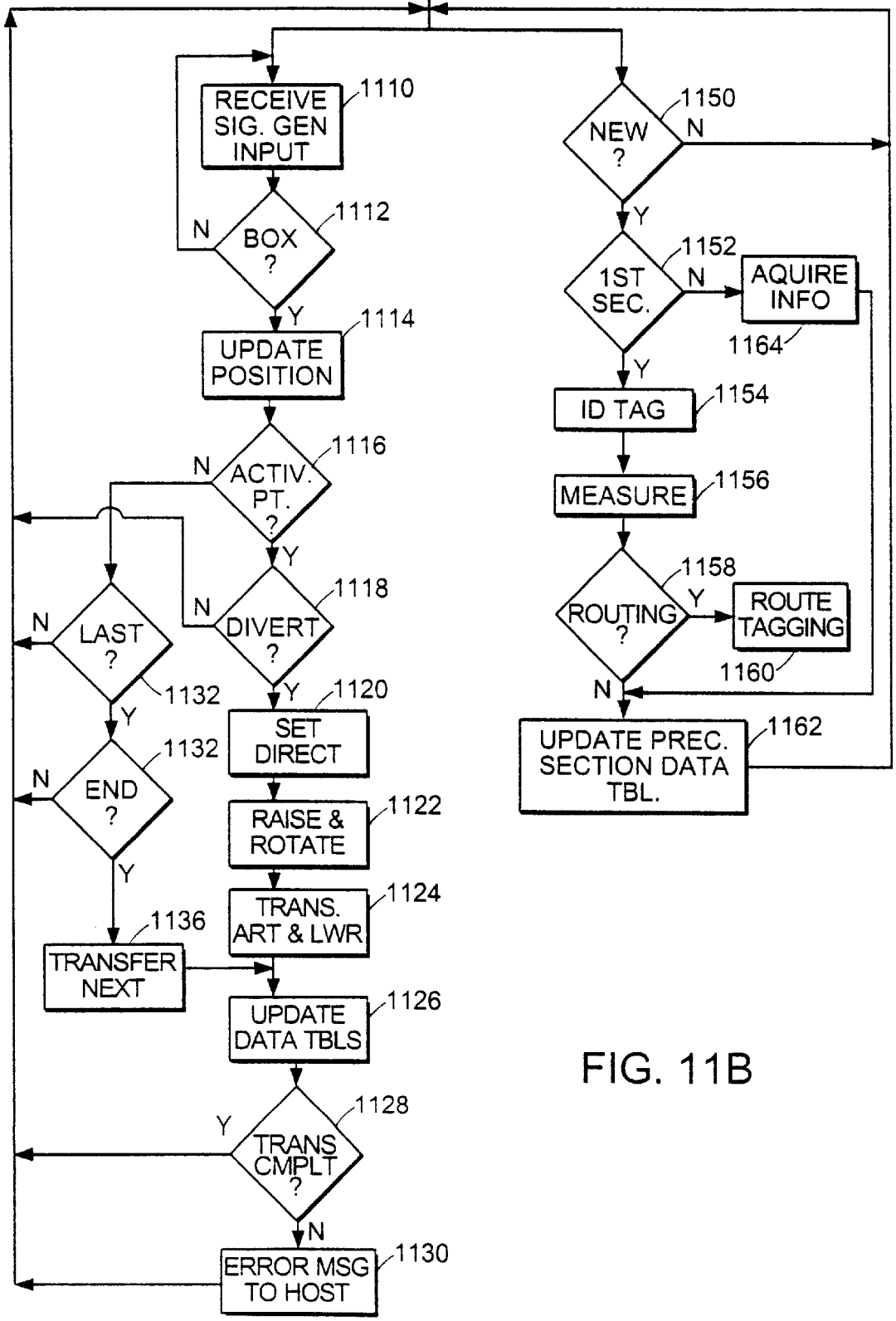
Figure 11C:
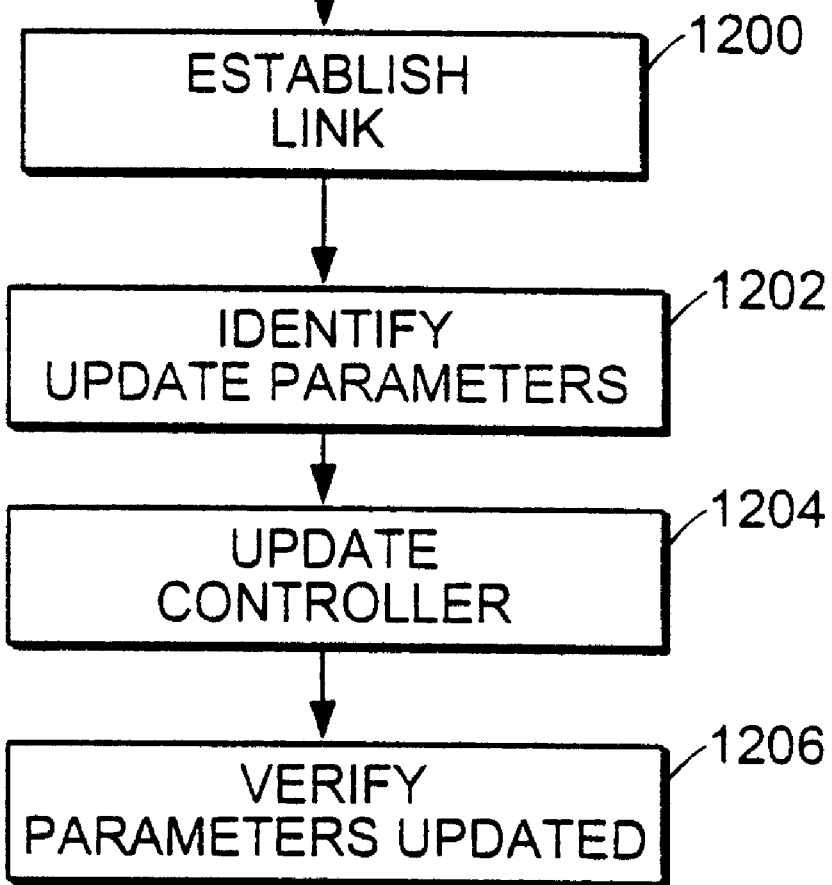

The processor 110 preferably includes a non-volatile random access memory (NVRAM) 132, an EEPROM 134 and a central processing unit 136. The applications program or software routines, hereinafter described in connection with FIGS. 11A–C, are preferably stored on the EEPROM 134 which is easily removed in the field for replacement. The configuration parameters preferably are stored in the NVRAM 132 so they are easily changed in the field, particularly by the user.

To update the applications program for any of the conveying sections of a conveying system according to the instant application, an EEPROM 134 is programmed in the factory and sent out to the field for installation. Because of the modularity of the conveying system sections and the interactive communications between controllers during system operation, further debugging prior to full system operation is not required for the instant invention. This saves time and money in comparison to known systems that are customized for a given application which limits the ability to factory test or validate the applications program prior to installation.

The NVRAM 132 stores data and any parameters required for the operation and/or configuration of each controller 100. For example, the data regarding the boxes or articles in an area or section under the control of a given controller 100 and any related tracking and routing data for each of these boxes or articles is stored in the NVRAM. Further, the configuration parameters required to enable the control routines for a given section type of a conveying system are also stored therein.

The central processing unit 136 preferably is a PIC17C43 by MicroChip Corp., and alternatively it may be PIC17C44 by MicroChip Corp. The software routines stored in the EEPROM 134 are loaded into the central processing unit 136 and specific routines are enabled by means of the configuration parameters retrieved from the NVRAM 132. The central processing unit 136 executes the program and routines therein so as to control each of the apparatuses 10a,b connected thereto. For example, if there are two apparatuses 10a,b under the control of the controller, the central processing unit 136 outputs signals to control one of these apparatuses so each box or article is either passed through the apparatus 10a or is diverted in a pre-specified manner. As such, the controller 100 controls the flow of boxes or articles (i.e., product) through each apparatus under its control and in the system. Also, the central processing unit 136 would direct information to be retrievably stored in the NVRAM 132 concerning an article or box on the section.

As noted above, the controllers 100 of the instant invention are interconnected to each other for communications by appropriately interconnecting the inflow and outflow bi-directional communications ports 124a,b; 122a,b of at least two controllers. There is shown in FIG. 7 a block diagram of an exemplary communications network 200 for a plurality of controllers 10a–g.

The controllers 100a–f preferably are connected to each other using a "daisy chain" topology. Starting from the upstream most point, the first controller 100a, a connecting cable 130 is interconnected to an outflow bi-directional communications port 122a of the first controller 100a and into an inflow bi-directional communications port 124a of the second controller 100b. Thus, a bi-directional communications link is established between the first and second controllers 100a,b for the communication of data and information therebetween. In a similar fashion, there is established a communications link between the fifth and sixth controllers 100e,f.

As indicated above, in one operating mode a sorting/diverting apparatus of the instant invention can be configured so articles are diverted or sorted into a single discharge path, i.e., a uni-directional sorting/diverting apparatus. Thus, an article can either pass through or be diverted by the apparatus. In this case, information and data flow is split between two downstream paths such as that shown for the second, third and fourth controllers 100b–d. Again starting with the upstream controller, the second controller 100b, two connecting cables 130 are connected to the outflow bi-directional communications ports 122a,b of the second controller 100b. The other end of one connecting cable 130 is connected to an inflow bi-directional communications port 124a of the third controller 100c and the other connecting cable is connected to an inflow bi-directional communications port 124a of the fourth controller 10d. Thus, a bi-directional communications link is established between the second and third controller 100b,c and the second and fourth controllers 100b,d for the communication of data and information therebetween.

In addition, to forward and backward communications between controllers that are directly connected (e.g., the first and second controllers 100a,b), the communications network 200 permits such communication throughout the entire network 200. For example, the sixth controller 10f may communicate with the first controller 100a by means of the communications links established respectively between the first and second controllers 100a,b, the second and fourth controllers 100b,d, the fourth and fifth controllers 100d,e and the fifth and sixth controllers 100e,f. Thus, the communications links not only establish a local communications links between individual controllers but allows establishes communications links between any controller in the network. Also failure to communicate with a succeeding controller would be detected by the transmitting controller, and this failure is communicated back to the host computer 204 to identify and localize the failure.

Also shown is one means for interconnecting an external device, such as scanner 202 and/or a host computer 204, to the controller communications network 200. The host computer 204 is interconnected to a buffer device 206 which in turn is interconnected to one of an inflow bi-directional communications port 124a of the first controller 10a. Similarly, a scanner 202 may be connected to a communications port of the buffer device 206. The use of a buffer device 206 in connection with the host computer 204 enables forward and backward communication between the controllers 10a–f as well as forward and backwards communications between the host computer and any one or all of the controllers 10a–f of the communications network 200. For example, the host computer 204 using the established communications links could re-program one or any number of controllers from a central location, even while "on the fly" (e.g., while a system is in operation).

Figure 8A:
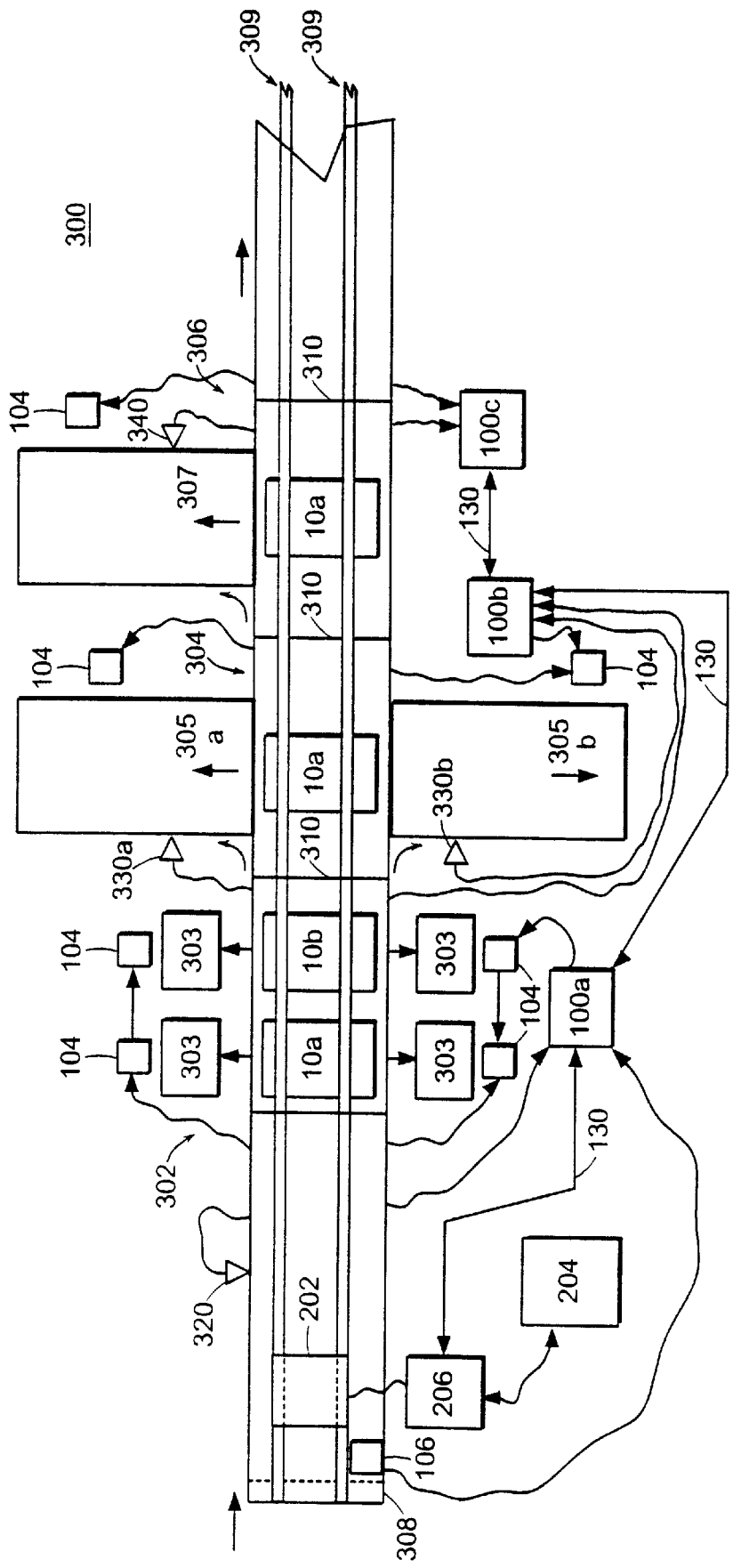
FIG. 8A is a plan view of an exemplary sorting/diverting system of the instant invention.

Now referring to FIG. 8A, there is shown an exemplary sorting/diverting system 300 that uses the above described controller 100 and apparatus 10 to sort and divert articles traveling along the system. Each area in the system 300 under the control of an controller is referred to as a section of the system. The controller 100 of each section is given a unique identification number or address so each section is uniquely identifiable to, and addressable by a host computer 204.

The illustrated system 300 includes a first section 302 that includes a plurality of apparatuses 10a,b for sorting of articles, a second section 304 that includes a single apparatus 10a that performs bi-directional diverting and a third section 306 including a single apparatus for diverting into a single pathway. Also included is a signal generating device 106 located that is located in the system before the first section 302 and a plurality of external input devices 104 as described more particularly below. The system also includes a first controller 100a to control the operation of the first section 302, a second controller 100b to control the operation of the second section 304, and a third controller 100c to control the operation of the third section 306. Further, an interconnecting cable/twisted wire 130 interconnects each controller 100a–c thereby establishing a bi-directional communications network for the conveying system 300.

The foregoing described system is exemplary and should not be considered as being a limitation of the types of systems the above described device can be used. It is within the scope of the instant invention for a system to be configured with any number of sections that perform sorting and diverting functions. Also, it is within the scope of the instant invention for each section to be configured with one or more sorting/diverting apparatuses 10 of the instant invention, where each of these apparatuses are separately configured to perform uni-directional or bi-directional sorting/diverting functions.

The signal generator 106 includes a sensor that senses the rotation of a drive wheel 308 for the moving belts 309 and provides a signal output as the drive belt rotates an incremental value. In this way, the signal output is representative of an incremental advancement of the drive belts 309. As indicated above, the periodic signal outputs from the signal generator 106 is inputted to the first controller 10a.

For example, a signal generator 106 can include a wheel that rotatably engages the drive wheel 308. The signal generator wheel includes a plurality of equidistant radial through apertures in the sides of the wheel. The generator also includes a light source and a photo-eye. The light source is arranged on one side of the wheel so the light beam is selectively passed through the radial slots and blocked by the side of the wheel as it rotates. The photo-eye is disposed on the other side of the wheel to detect the light pulses and, correspondingly, provide a pulsed signal output. It should be recognized that there are a number of techniques known to those skilled in the art for generating such periodic signals.

A photo-eye 320 or other sensing device is located at a specific position with respect to the beginning of the first section 302 to sense the leading edge of an article traveling along the moving belts 309. The signal output from this photo-eye 320 is one of the inputs feed to the processor 110 of the first controller 10a. Alternatively, the photo-eye 320 can be disposed at the beginning of the first section 302. The sensing device used at this position can be any of a number of devices that can detect the presence of an article and provide an output signal representative thereof (e.g., a traveling wheel displace by the article).

Although only one photo-eye 320 or other sensing device is illustrate, it is within the scope of the instant invention for a system 300 to be configured with a plurality of such photo-eyes. The additional photo-eyes, preferably are located at a designated end 310 of a section. In this way, the controller of a following section receives a positive indication of a box/article being at the designated end 310 or known position.

The system also includes a plurality of information displays 104 that are appropriately interconnected to each of the controllers 100a–c of the system. In the illustrated embodiment, there is one information display provided for each diverting/sorting path for each of the sections 302–306 as discussed below.

The overall operation of the sorting/diverting system 300, the individual sections thereof and the controls thereon by the individual controllers 100a–c is best understood from the following discussion and with reference to FIGS. 1–10. For purposes of discussion, the system 300 shall be assumed to be a system for conveying and sorting out boxes, e.g., the boxes containing prerecorded VCR cartridges. However, it shall be understood that the system is not limited to the either the illustrated system or to just box handling systems.

As boxes enter into the system 300, a bar code scanner 202 scans each box to identify the bar code and thereby the information encoded therein. For, example, the bar code labels would contain information such as the particular name of the film recorded on the VCR cartridge in the box being scanned.

The information from the bar code scanner 202 is provided to the host computer 204, which determines the routing through the system 300 for each box. When the presence of a box is detected by the sensing photo-eye 320, the controller 100a for the first section 302 gives a unique identifier (e.g., identification number) to the bag and updates the data table 500 (FIG. 9) for the first section 302 to include the identification number, the length of the box as well as the routing information for the box from the host computer 204. When a section comprises a plurality of bi-directional sorting/diverting apparatuses 10a,b, like the first section 302, the routing information also indicates the specific apparatus on the section to be activated and in which direction it is to divert/sort the box.

The processor 110 of the first section controller 100a using the periodic signal inputs from the signal generator 106, continuously updates the position of the box on the first section 302. When the box is determined to be at the activation point for the first sorting/diverting apparatus 10a of the first section 302, the processor 110 determines if the box should be sorted now and, if so, in what direction based on the data table routing information.

If yes, then the diverting rollers 30 are raised and the drive motor 20 rotates the diverting rollers in the correct direction for sorting. For example, the rollers 30 would be raised and rotated in a counterclockwise direction so a box would be diverted to a pathway at an angle, e.g., 90° to the belts 309. In the illustrated embodiment, the first section 302 is for sorting. Thus, the box being diverted would be essentially tossed into the appropriate storage bin 303 by the rotation of the diverting rollers.

If not, then the box continues traveling on the first section 302 and the processor continues to update the data table position information. When the box is determined to be at the activation point for the second sorting/diverting apparatus 10b of the first section 302, the above described process is repeated.

As each box is sorted out into one of the four bins 303, the first section controller updates the alpha-numeric display 150 (FIG. 10) of each information display 104 for each sorting direction and for each apparatus. When a preset number of boxes has been sent to a given bin, representative of the bin being filled, then the processor 110 for the first controller 100a activates a warning device 152 and prevents further diverts to that bin. The warning device is a visual alarm such as a blinking or steady colored light or alternatively the warning device is an auditory alarm.

The processor 110 also sends a message back to the host computer and activates any contingency programs/ instructions to cover this situation. For example, one of the bins may be designated as an overflow bin to handle these situations. Thus, the processor 110 would automatically re-direct the box to the overflow bin.

After the condition leading to the activation of the warning device is resolved, e.g., an empty bin is put in place of the filled bin, the user pushes a reset button 154 (FIG. 10) on the information display 104. This sends a signal back to the processor 110, which resets the box totalizer or counter to zero and resets the flag indicating the presence of a warning condition. Thus, the bin is now available to receive boxes and the diverting path is now open for diverts. The alpha-numeric display 150 correspondingly is reset to zero when the box totalizer is reset.

The information display 104 also includes a set button 156 so a user can send a signal back to the processor 110 to reset the box totalizer or counter to zero when replacing a partially filled bin with an empty bin. The alpha-numeric display also is reset at the same time.

If the box is not sorted out in the first section 302, the first section controller 100 continues to track until it reaches the designated end 310 of the first section. Preferably, a position in the system is designated as the end 310 for each section. In this way, any in field adjustments to the components of the upstream section, e.g. fine tuning the location of an activation point, does not require resetting activation points for all the following sections.

When the box is determined to be at the designated end 310 of the first section, the first section controller 100a communicates with the second section controller 100b. As part of the hand off process, the data table 500 of the receiving section is updated to include the information for each box departing the prior section and entering the receiving section. Correspondingly, the data table 500 for the departing section is updated to delete the information for each departing box.

The processor 110 of the second section controller 100b using the periodic signal outputs from the signal generator, being communicated over the communications network, continuously updates the position of the box on the second section.

If it is to be diverted, the diverting rollers 30 are raised and rotated in the appropriate direction so the box is diverted in the desired direction. The system also includes a photo-eye 330a to sense the presence of a box diverting in one direction 305a and another photo-eye 330b to sense the presence of a box in the other direction 305b. The outputs from these photo-eyes 330a,b are inputted to the processor 110 of the second controller 100b as external device inputs. These inputs are used to verify that the box was correctly diverted.

If the box is not correctly diverted, an output is sent back to the host computer 204 to identify an error. This input can be used to identify boxes being removed from the system by external means or a box which was not properly diverted. This information is retained by the host computer 204 and/or the processor 110 for recording keeping purposes. This information also can be evaluated by either the host computer 204 and/or the processor 110 for the second section to determine if the second section is mal-performing.

If the box is not correctly diverted, an output is sent back to the host computer 204 to identify an error. This input can be used to identify boxes being removed from the system by external means or a box which was not properly diverted. This information is retained by the host computer 204 and/or the processor 112 for recording keeping purposes. This information also can be evaluated by either the host computer 204 and/or the processor 112 for the second section to determine if the second section is mal-performing.

In a similar fashion as that described for the first section 302, the alpha-numeric displays 150 for the two information displays 104 for the second section 304 are respectively updated as boxes are diverted into the appropriate pathway or direction.

As with the first section if the box is not acted on by the second section 304 it is passed onto the third section 306 when the box is determined to be at the designated end 310 of the second section 304. The box is processed in the third section 306 in essentially the sane fashion as described above for the first and second sections, except the drive motor 20 only rotates in one direction because the third section is configured for uni-directional diverting. Also, the alpha-numeric display for the information display 104 for the third section 304 is updated, as described above, as and when boxes are diverted.

Figure 8B:
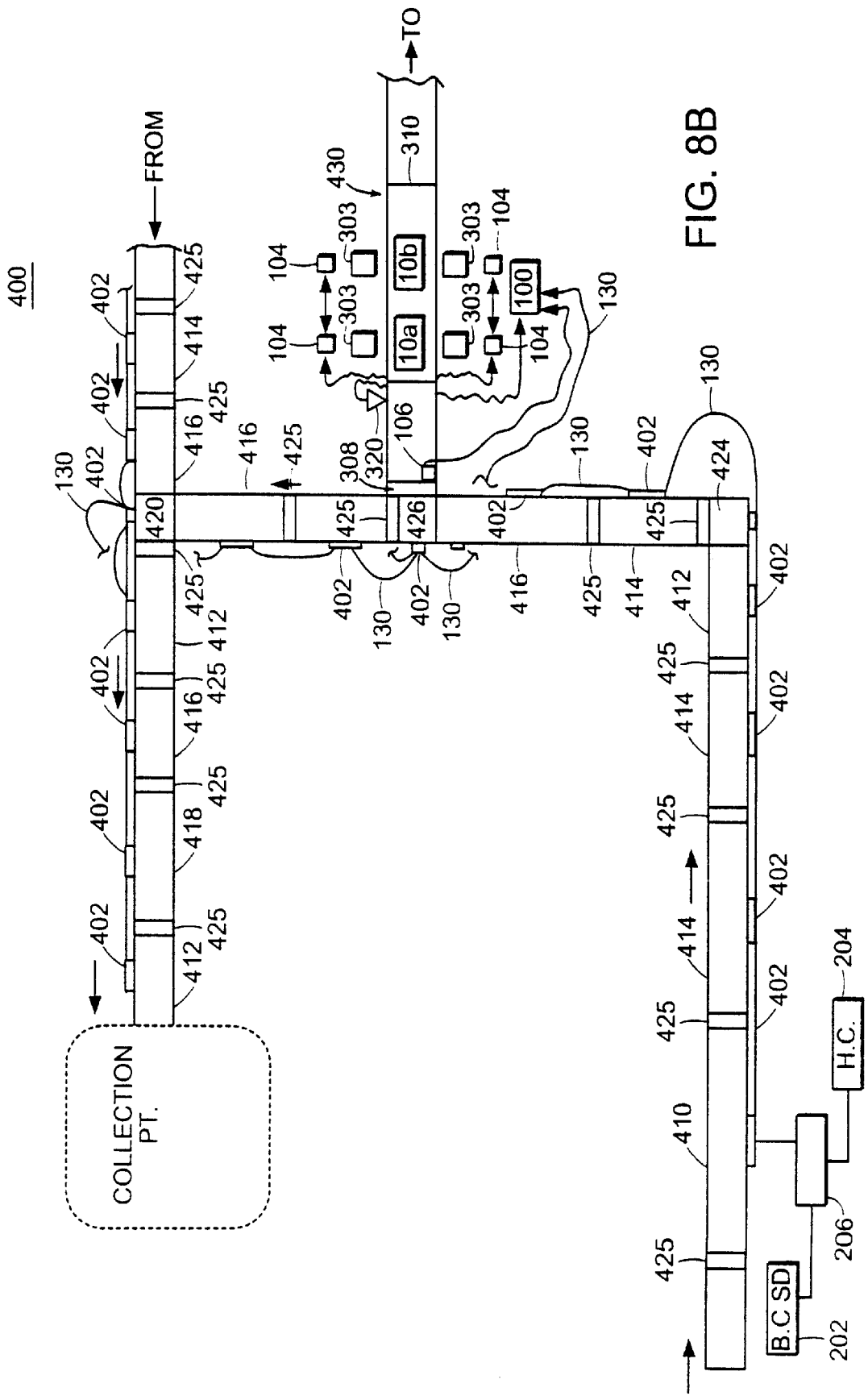
FIG. 8B is a plan view of an exemplary conveying system using a controller and apparatus of the instant invention in conjunction with other types of conveying system sections.

Alternatively, and as illustrated in FIG. 8B, the modular section including sorting/diverting apparatuses 10 and apparatus controllers 100 of the instant invention can be used in a conveying system 400 including a multiplicity of conveying sections as described in U.S. patent application Ser. No. 08/752,587 the teachings of which are incorporated herein by reference. Each of these modular conveying sections, described in detail in the above referenced patent application, includes a section controller 402 that controls the functions of one of these conveying section including the designated task or tasks to be performed for transporting an article, package or box through the system. The section controller 402 of each modular conveying section also is given a unique identification number or address so each section is uniquely identifiable.

The illustrated conveying system 400 includes a first section 410, a multiplicity of straight sections 412, a multiplicity of accumulating sections 414, a multiplicity of index sections 416, an incline/decline section 418, a merge section 420, a spacer section 422, a corner section 424 and a conveying system diverter section 426. The system also includes a sorting section 430 using sorting/diverting apparatuses 10 and the associated apparatus controller 100 of the instant invention. An interconnecting cable/twisted wire 130 interconnects each section controller 402 as well as the apparatus controller 100 of the instant invention thereby establishing a bi-directional communications network for the conveying system 400.

The conveying system 101 also includes a multiplicity of tracking signal generating devices 425 that are disposed at the front of, or alternatively at the end of, selected ones of the conveying sections. Each tracking device, includes a roller mechanism that projects above the nominal surface of the conveying sections and which is depressed by the passage of a package, box or article thereover. The tracking device 425 also includes a sensor that senses the downward motion of the roller mechanism and outputs a signal therefor which indicates the presence of an article/box. The tracking device 425 further includes a sensing mechanism to determine the length of the article or box passing over the roller mechanism. For example, the sensing mechanism detects the fractional and full rotations of the roller mechanism while it is depressed and equates this to a length. Such a device also is described in U.S. patent application Ser. No. 08/529,991, the teachings of which are incorporated herein by reference. The system 400, as described above in connection with FIG. 8A, also includes the signal generator 106 and external input devices 104, e.g., photo-eyes, for operation of the sorting section 430.

For the straight sections 214, accumulation sections 414, spacer sections 422, index sections 416, conveying system diverter sections 426 and merge sections 420, hereinafter conveying system sections, the applications program in each conveying section controller 402, preferably includes the instruction and criteria to control the operation of any of these different section types. It should be noted that the conveying system diverter sections 426 referred to is an alternative design, shown and described in the above referenced patent application Ser. No. 08/529,991, to that described hereinabove. The applications program accesses the control routines specific to the operation of a given type of conveying section (e.g., an index section) by evaluating the data and configuration parameters stored in the read/write memory. For example, the section type is a parameter that is stored in a data table set up in the read/write memory. The applications program for the sorting/diverting apparatus controller 100 is as described herein.

In operation, data relating to the articles on the various sections making up the conveying system 400 is stored in the read/write memory for a given section controller 402, 100. The applications program also further includes instructions and criteria for real time tracking of articles on each conveying section. Thus, a remotely located host computer 208 (FIG. 7), using the communications network established between and among the controllers 402, 100, can make an inquiry to any controller for such real time information. Further, when articles are transferred from an upstream conveying section to a downstream section, the data stored in the read/write memory of the upstream controller is communicated to the downstream controller.

In an alternate embodiment, the communications control routine for a conveying system section controller 402, includes steps and/or actions so a transmitting controller can detect a communications failure with a succeeding controller and communicate this failure to the host computer 204, thereby identifying and localizing the failure. The succeeding controller is another conveying system section controller 402 or a controller 100 for a sorting/diverting apparatus of the instant invention. To accomplish this, the communications or message processing functions of each conveying system section controller 402, further includes the functions and attributes described below in connection with FIGS. 11A–C, in particular FIG. 11A, step 1002 and steps 1014–1018.

Figure 9:
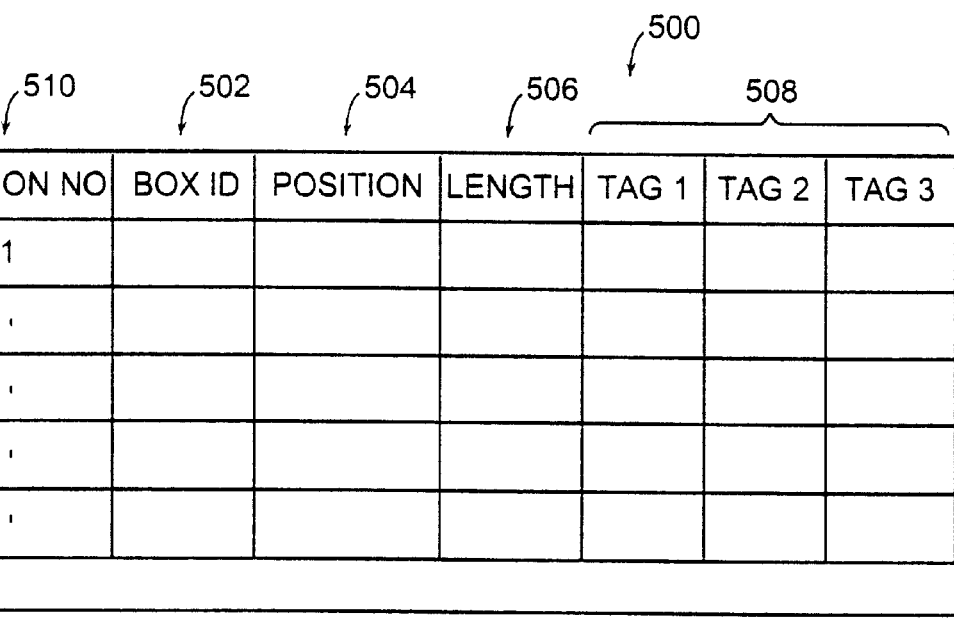
FIG. 9 is an exemplary data table of the information concerning the articles in transit that is stored in each controller.
Figure 10:
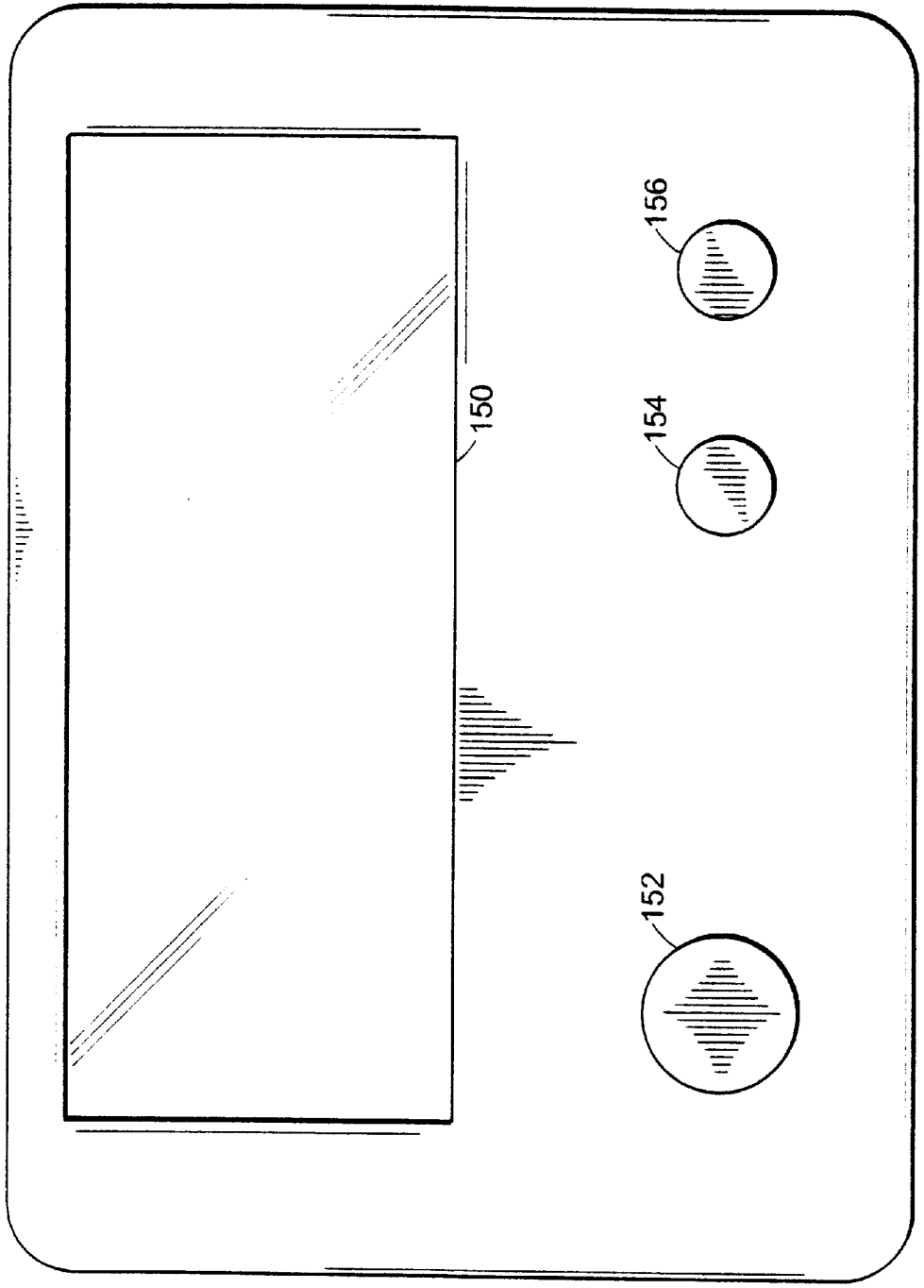
FIG. 10 is an information display of FIG. 6.

As indicated above, data is stored in the NVRAM 22 of each conveying section controller 402 and each apparatus controller 100 concerning each box/article (i.e. product) that is on a given section of a system 300,400. An exemplary data table 500 for this information is shown in FIG. 9. As illustrated, the data table 500 contains an indication 502 of the identification number assigned to the particular box or article on the section. Further, there is contained a position indication 504, a length indication 506 and routing tags 508 or section addresses for each item on the data table 500. While three route tags or section addresses are illustrated, this is not a limitation as there may any number of routing tags. For apparatus controllers of the instant invention, the route tag information identifies the specific sorting/diverting apparatus 10 on a section to be activated and the specific sorting/diverting direction (e.g. Sa). As also indicated above, the information or data on the data table 500 is updated as, and when, articles leave and enter a section.

There is shown in FIGS. 11A–C, a flow chart illustrating the basic operations and steps followed by the communications and control routines of a controller 10 according to the instant invention. Reference also should be made to FIGS. 1–10 for the specific components of a sorting/diverting apparatus 10, an apparatus controller 100, a sorting/diverting system 300, the communications network 200, and/or the information display 104 referred to hereinafter. Although the following describes the basic operations and steps in terms of system of a system of controllers 100 of the instant invention, this is not a limitation as described above in connection with FIG. 8B.

As provided herein, the control routine, that controls the function or operation of each section of apparatuses 10, is established by the configuration parameters programmed into each controller 100. Further these configuration parameters are under the control of the user and as such are easily changed in the field. The controller 100 for each section is initially programmed with the configuration parameters required for proper operation of the sorting/diverting apparatus 10 or apparatuses that make up a given section. As indicated above, these parameters preferably are stored in the NVRAM 132 so they are not lost if a power failure occurs. The configuration parameter indicates the number of apparatuses making up a section and whether the apparatus (es) is uni-directional or bi-directional as well as other operational parameters, for example, the location of activation points and the location of the designated end for each section.

Each apparatus controller 100 is initially configured or reconfigured in one of two ways. The host computer 204, using the communications network 200 established between each of the apparatus controllers 100 of a system, establishes a communications link with each controller. Using this link, the host computer 204 programs in the appropriate configuration parameters. Alternatively, a terminal or computer is connected to the RS232 I/O port 120 of each controller 100 and each controller is programmed with the initial configuration parameters.

After each controller 100 is initially configured the system is powered up and the transport of product, articles, boxes, through each section of the system is started, step 1000. Thereafter, each controller 100 of a conveying system 101 performs a number of functions in parallel. In particular, each controller 100 evaluates all messages it receives and implements the specific control routine(s) of the applications program so the sections functions as intended (e.g., functions as an section with a uni-directional and a bi-directional sorting/diverting apparatus). That is, the controller performs its communications protocol routines independently of its function specific control routine(s). It should be recognized that while the following may show or describe steps or operations in series or in parallel, it is within the scope of the present invention for the steps to be performed in different sequences than that illustrated and described herein.

For purposes of the following discussion the terms present section, prior/previous section(s) and next section(s) are used A to distinguish different sections of a portion of a system. The present section is any of the sections comprising the system, however, in the following this term is generally used to identify the section(s) of a system that is perform the specific control routine being described. Prior/previous section(s) is used to identify the section(s) immediately preceding the present section. Next section(s) identifies the section(s) that immediately follow the present section.

When performing its communications or message processing functions, the controller 100 of the present section evaluates all messages being received over the bi-directional communications network 200. Additionally, the present section controller determines if a message being received is for the present section controller or for another controller, step 1002.

If the message is not for the present controller (NO) then the message is sent onto the next or previous controller, step 1014. The present section then monitors the communications link for a return acknowledgement signal (ACK) from the next section controller acknowledging receipt of the message. If the present section controller, receives a signal indicating the message was not correctly received, the present section controller resends the message. The present section controller will attempt to send the message a preset number of times, e.g., three times, before categorizing the failure as "no message" received.

The present section following a send monitors the communications network to determine if the message is received, step 1016. If the present section controller does not receive either an ACK or a NACK from the next section controller or the present section control has a resend failure (NO), then the present section controller sends an error message back to the host computer 204 via the communications network that also identifies the failed communications link, step 1018. This readily identifies communication problems so the host computer 204 can provide a warning message to the user so appropriate corrective action can be taken. After transmitting the error message (step 1018) or if the message is received (YES, step 1016), the process returns to the beginning of the communications control routine, step 1002.

If a received message is for the present section controller (YES, step 1002), and the received message was correctly transmitted and received, then the controller outputs an acknowledgement message back to the prior section, step 1004. If the message is not correctly received, then the present section controller outputs a NACK back to the prior section controller and the process proceeds as described above.

After send the ACK message, the present section controller evaluates the message to determine if it is a programming message, step 1006. As noted above, any or all of the controllers 100 of a system 300 may be accessed by the host computer 204 to initially set or to alter the controller's configuration parameters. For example, the configuration parameters may have to be changed when there is change in the physical layout or arrange is ment of the conveying system or when the activation points need to be adjusted. If it is such a message (YES, step 1006), then the process proceeds to step 1200, FIG. 10C.

If it is not a programming message (NO, step 1006), then the present section controller evaluates the received message to see if it is a data inquiry message, step 1008. The host computer 204, using the bi-directional communications network 200 of the controllers, can send out a message that requests one, all or any combination of controllers to output a data message. If it is a data inquiry message (YES) then the present section determines if a reply is required, step 1010. If a reply is required (YES, step 1010), then the present section controller 100 sends a message to the host computer 204 using the bi-directional communications network of the controllers, step 1012.

For example, the host computer 204 could send out an inquiry message to all controllers of a system requesting the location(s) of a specific package(s). The controller 100 for each section would evaluate its data table 500 to determine if the package(s) are located on its section. If yes, the controller would send the appropriate reply back to the host computer 204 via the bi-directional communications network 200. After sending the message, or if no reply is required (NO, step 1010), then the process returns to the beginning of the communications protocol, step 1002.

As indicated above, the controller 100, after the process is started, step 1000, implements the specific control routine(s) of the applications program so each section functions as intended (e.g., functions as an section with a uni-directional and a bi-directional sorting/diverting apparatus). As also noted above this done concurrently with the controller performance of its communication protocols.

Because of the re-programmability and multi-mode operation capability of the sorting/diverting apparatus 10 of the instant invention, such an apparatus can be re-configured temporarily to function in different ways. For example, the apparatus(es) of a section can be configured so articles pass straight through the section (e.g. no diversion/sortation) or so the articles always are turned through 90° to the travel path (i.e., section functions as a corner). In addition, each apparatus also can be reconfigured to function in either a uni-directional or bi-directional fashion.

This capability allows the user to alter the functional arrangement of a system without requiring hardware changes to individual sections, without removing of sorting/diverting apparatuses or altering the physical arrangement of the system. Thus, a system of the instant invention can be easily configured to operate temporarily in one fashion and then returned to its normal system functional arrangement simply by reprogramming the configuration parameters of affected controllers.

Referring next to FIG. 11B, there is shown the control routine to perform the sorting/diverting for operation of the sorting/diverting apparatus of the instant invention. The present section controller continuously monitors the communications network and its external input to determine if a new article is about to arrive on the present section, step 1150 and also continuously performs positional evaluations of the articles, e.g., boxes, traversing the section to determine what action if any should be required.

If a new article is to arrive (YES, step 1150), then the controller next determines if this is the first section in the system, step 1152. As indicated above, preferably, the system 300 is configured with a photo-eye 320, or other sensing device (e.g., roller mechanism is depressed), at the beginning of the system, or at the beginning of the first section, to provide a positive indication of the arrival of goods (e.g., box, article) in the system and/or at the first section's front end. When a new article is sensed by the photo-eye 320 or other sensing device, and the present section is the first section of a system (YES, step 1152), then the present section controller assigns a unique identification tag or number to the box, step 1154. Using the photo-eye signal inputs and signal inputs from the signal generator 106, or other length measuring means known in the art, the present section controller also determines the length of the new article, step 1156. Alternatively, the controller 100 can be configured to receive the length information from an upstream source (e.g., host computer) or configured with a specified default length.

A system and its controllers also can be configured to route the boxes or articles about the system in a predetermined fashion. Thus, if a box/article is to be routed around the system (YES, step 1158), the host computer 204 provides the desired route tags to the present section controller, step 1160. The route tags generally identify the address of the section and the specific section sorting/diverting apparatus at which some action is to be taken relative to routing as well as the specific sorting/diverting direction. For example, when the box arrives at a sorting/diverting apparatus for a section, corresponding to the specified address or identification number, then the box would be diverted to one of the outgoing lines according to the routing instructions.

After obtaining the routing information (step 1160), or if the box is not to be routed (NO, step 1158), the data table 500 for the present section controller is updated, step 1162 to include the information for the new box/article. This includes the identification number 502, length 506 and, when applicable, the route tags 508. The process then returns to the beginning of the control routine for the present section namely the process returns to steps 1110,1150. The data table 200 also includes an identifier 510 or address for the present section.

If the present section is not the first section of the conveying system (NO, step 1152), then the present section controller acquires information from the prior section, step 1164. In particular information regarding the length of the next box/article to arrive. The present section controller also updates its data table 500 with the data/information for the box that just arrived, step 1162.

As noted above, the present section controller 100 controls the passage of goods through the present section and onto the next section. Whiled doing this, the present section controller continuously monitors its inputs and the communications network to receive the periodic signals being generated by the signal generator 106, step 1110. If a box/article is located on the present section (YES, step 1112) then the present section controller also continuously updates the positional location for each box/article on the present section using the signal inputs from the signal generator, step 1114. The present controller also causes the locational information 504 in the present section data table 500 to be updated accordingly.

The present section controller evaluates the locational information for each in-transit box/article to determine if it is located at the activation point for one of the sorting/diverting apparatuses, step 1116. The control routine has the flexibility to control which part of the box must be at the activation point for purposes of sorting and diverting and for determining if this part of the box is at the activation part. Thus, the control routine is configurable to take action when the leading edge of a box is at the activation point, the approximate center point of the box in terms of its length is at the activation point, or some other position along the length of the box is at the activation point. For example, by selecting the midpoint of the box as being the trigger for the activation point, the box can be diverted or sorted without turning of the box.

If the present section controller determines that the specified point of the box is at the activation point (YES, step 1116), then the controller determines if the box should be diverted at that location. Simply, the present section controller looks at the route tags in the data table 500 for the box at the activation location to see if the route tag corresponds to the sorting/diverting apparatus at that location. If the box should not be diverted at this activation point location (NO, step 1118), then the box is passed through the activation location and the process returns to the beginning of the control routine.

If the present section controller determines that the box should be diverted/sorted at this location (YES, step 1118), then the controller evaluates the data table route tag information to determine which direction the box should be diverted into and sets the controls so the diverting rollers 30 will rotate in the correct direction, step 1120.

The controller then causes at least a portion of the diverting rollers 30 to be raised up above the moving belts 309 and rotated in the correct direction, step 1122. The box, which is no longer in contact with the moving belts 309 is diverted from its original travel direction into a new direction into a bin or onto another set of moving belts. After transferring the box from the present section to the next section, the diverting rollers are lowered below the moving belts passing through the present section, step 1124. Thereafter, the data tables for the present and next section are updated by deleting information from the present section data table and adding information to the next section data table, step 1126.

As indicated above, the system also can include photo-eyes or other sensing devices to verify that the box was diverted correctly. When the system is so configured, the present section controller monitors the inputs from the photo-eyes provided for this purpose to determine if the box was transferred to the next section, step 1128. If not (NO), then an error message is communicated back to the host computer 204, step 1130. In addition, these error messages also can be evaluated at the same time by the present section controller to determine if the apparatus has failed and to go to an alternate diverting or sorting plan or to bypass the failed apparatus until the user has resolved the problem.

If the box is not at an activation point (NO, step 1116), then the present section controller determines if the box is at or beyond the last activation point of the present section, step 1132. If the box is, then the controller next determines if the box is at the designated end for the present section, step 1134. Each section has a designated end for purposes of defining the transition point between sections irrespective of the activation points. In this way, temporary re-configurations to the present section or adjustment/fine tuning of activation points can be accomplished without affecting the prior or next sections. If the box is at the designated end of the section (YES, step 1134), the box is transferred onto the next section, step 1136 and the data tables for the present and next sections are updated, step 1126.

The process returns to the beginning of the control routine when any one of the following conditions are meet; a box is at an activation point (YES, step 1116) but is not to be diverted (NO, step 1118), the box is not at or beyond the last activation point on the present section (NO, step 1132), the box is not at the designated end point (NO, step 1134), the box being diverted was successfully transferred to the next section (YES, step 1128).

Referring next to FIG. 10C, there is shown the control routine for accessing the present section controller 100 for the initial programming or re-programming of the controller's configuration parameters using the bi-directional communications network. Preferably, the host computer 204 outputs a message to a controller 100 indicating that it to be programmed/re-programmed (YES, step 1006 FIG. 10A).

To program or re-program the configuration parameters, a link is established between the host computer 204 and the controller to be programmed/re-programmed, step 1200. This typically involves the transmission of acknowledgement messages between the host computer 204 and the controller 100 over the communications network 200.

The host computer 204 then transmits the parameters to the present section controller 100 that are initially being set therein or that are being updated or changed, step 1202. For example, when initially configuring the controller 100 the computer must output all the configuration parameter information required for the system, the present section and the one or more apparatuses of the present section to correctly operate. Whereas, for example, for updating/re-programming it may change one of the configuration parameters (e.g., change from a mi-directional to a uni-directional diverting mode or operation).

The controller 100 takes the transmitted information and stores it in the NVRAM 132, step 1204. The controller 100 and host computer 204 then undertake a process to verify that the parameters have been properly updated/set, step 1206. Thereafter, the present section controller returns to monitoring the bi-directional communications network for messages directed to its address, step 1002 (FIG. 10A).

As noted above, each controller also may be initially configured or updated using the RS232 I/O port 120. In operation, the process for programming the controller using the I/O port 120 is similar to that described above.

Although a preferred embodiment of the invention has been described using specific terms, such description is for illustrative purposes only, and it is to be understood that changes and variations may be made without departing from the spirit or scope of the following claim.

What is claimed is:

1. A controller that controls at least one sorting/diverting apparatus for use in a system including a plurality of such controllers, each apparatus controller comprising:
   at least one bi-directional inflow port;
   at least one bi-directional inflow port;
   a processor that processes information and provides outputs, where at least one output controls the at least one sorting/diverting apparatus;
   an applications program for excution within the processor, wherein the applications program includes instructions and criteria for processing information and providing the processor outputs; and
   wherein the instructions and criteria of the applications program includes:
      instructions and criteria for communicating information among and between the controllers of the system using the bi-directional inflow and outflow ports,
      instructions and criteria for processing information received by said each apparatus controller,
      instructions and criteria for modifying the operation of the at least one sorting/diverting apparatus responsive to the communicated information;
      instructions and criteria for controlling the at least one sorting/diverting apparatus so an article in transit on a first travel pathway is selectively diverted to one of two outflow travel pathways for each of said at least one sorting/diverting apparatus, each outflow pathway being at an angle with respect to the first travel pathway; and
      instructions and criteria for selectively determining when to divert an article by means of the at least one sorting/diverting apparatus from the first travel pathway.

2. The device controller of claim 1, further comprising a read/write memory for storing data and parameters that control the operation of the applications program and wherein the applications program includes instructions and criteria for controlling data storage in the read/write memory.

3. The device controller of claim 1, wherein the applications program further includes instructions and criteria for real time tracking of data.

4. The device controller of claim 1, wherein the applications program further includes instructions and criteria to determine if a message being transmitted from a first controller to a second controller, by means of the at least one bi-directional inflow port and the at least one bi-directional outflow port, is received by the second controller and for providing an output signal when it is determined that the message was not received by the second controller.

5. The device controller of claim 1, wherein the instructions and criteria for selectively determining when to divert an article by means of the apparatus from the first travel pathway further includes instructions and criteria for determining if a specified portion of the article in transit is at a pre-specified location with respect to components of the sorting/diverting apparatus and wherein the article is diverted from the first travel pathway.

6. The device controller of claim 1, wherein there are two outflow pathways, each outflow pathway being at an angle with respect to the first travel pathway, and wherein the applications program further includes instructions and criteria for determining which of the two outflow pathways the article is to be diverted into, and wherein the instructions and criteria for controlling the at least one sorting/diverting apparatus includes instructions and criteria for controlling the at least one sorting/diverting apparatus so the article is diverted into the outflow pathway determined by the applications program.

7. The device controller of claim 6 wherein the two outflow pathways for each sorting/diverting apparatus are arranged so that one of these two outflow pathways extends from one side of the first travel pathway and the other of these two outflow pathways extends from another side of the first travel pathway.

8. The device controller of claim 1 wherein the sorting/diverting apparatus includes a plurality of rollers selectively rotatable in at least one of a clockwise or counterclockwise direction, the direction of rotation controlling the diversion of the article in transit into the one of the two outflow pathways and wherein the instructions and criteria for controlling the at least one sorting/diverting apparatus includes instructions and criteria for controlling selection of the direction of rotation.

9. The device controller of claim 8, wherein the instructions and criteria for controlling the at least one sorting/diverting apparatus includes instructions and criteria for causing the plurality of roller to rotate in one of the clockwise direction so the article is diverted into one of the two outflow pathways or in the counter clockwise direction so the article is diverted into the other of the two outflow pathways.

10. The device controller of claim 8, wherein there are two sorting/diverting apparatuses being controlled by the controller and wherein the applications program further includes instructions and criteria for determining which of the two apparatuses to use for diverting an article in transit along the first travel pathway into the one of the two outflow travel pathways.

11. The device controller of claim 10, wherein the applications program further includes instructions and criteria for determining which of the two outflow pathways associated with one of the two sorting/diverting apparatuses the article is to be diverted into, and wherein the instructions criteria for controlling the at least one sorting/diverting apparatus includes instructions and criteria for controlling said one of the two sorting/diverting apparatuses so the article is diverted into the outflow pathway determined by the applications program.

12. A controller that controls at two sorting/diverting apparatuses for use in a system including a plurality of such controllers, each apparatus controller comprising:
   at least one bi-directional inflow port;
   at least one bi-directional outflow port;

a processor that processes information and provides outputs, where at least one output controls the at least one sorting/diverting apparatus;

an applications program for execution within the processor, wherein the applications program includes instructions and criteria for processing information and providing the processor outputs; and wherein the instructions and criteria of the applications program includes:

instructions and criteria for communicating information among and between the controllers of the system using the bi-directional inflow and outflow ports, instructions and criteria for processing information received by said each apparatus controller, instructions and criteria for modifying the operation of the at least one sorting/diverting apparatus responsive to the communicated information;

instructions and criteria for controlling the at least one sorting/diverting apparatus so an article in transit on a first travel pathway is selectively diverted to one of at least one outflow travel pathway each outflow pathway being at an angle with respect to the first travel pathway;

instructions and criteria for determining which of the two sorting/diverting apparatuses to use for diverting an article in transit along the first travel pathway into the one of the at least one outflow travel pathway; and instructions and criteria for selectively determining when to divert an article by means of the determined sorting/diverting apparatus from the first travel pathway.

13. The device controller of claim 12, wherein there are two outflow pathways associated with each of the two sorting/diverting apparatuses, each outflow pathway being at an angle with respect to the first travel pathway, and wherein the applications program further includes instructions and criteria for determining which of the two outflow pathways associated with one of the two sorting/diverting apparatuses the article is to be diverted into, and wherein the instructions and criteria for controlling the at least one sorting/diverting apparatus includes instructions and criteria for controlling said one of the two sorting/diverting apparatuses so the article is diverted into the outflow pathway determined by the applications program.

14. The device controller of claim 13 wherein the two outflow pathways for each sorting/diverting apparatus are arranged so that one of these two outflow pathways extends from one side of the first travel pathway and the other of these two outflow pathways extends from another side of the first travel pathway.

* * * * *